United States Patent [19]
Tagato

[11] Patent Number: 6,154,156
[45] Date of Patent: Nov. 28, 2000

[54] MESSAGE PROCESSING DEVICE AND METHOD THEREOF AND STORAGE MEDIUM STORING MESSAGE PROCESSING CONTROL PROGRAM

[75] Inventor: Hiroki Tagato, Tokyo, Japan

[73] Assignee: NEC Corporation, Tokyo, Japan

[21] Appl. No.: 09/264,188

[22] Filed: Mar. 5, 1999

[30] Foreign Application Priority Data

Mar. 5, 1998 [JP] Japan .................................. 10-073401

[51] Int. Cl.[7] .................................................. H03M 7/00
[52] U.S. Cl. .............................. 341/79; 341/78; 395/612; 704/500
[58] Field of Search ................................. 341/79, 78, 50, 341/141; 704/500, 201; 395/612, 611

[56] References Cited

U.S. PATENT DOCUMENTS 5,534,861  7/1996  Chang et al. .............................. 341/79
5,797,008  8/1998  Burrows ................................... 395/612

FOREIGN PATENT DOCUMENTS 1-198145  8/1989  Japan .

OTHER PUBLICATIONS

"Institute of Electronics, Information and Communication Engineers of Japan", *1997 National Conference Lectures Papers* (*Communication 2*), pp. 148, Mar. 1997.

"Institute of Electronics, Information and Communication Engineer of Japan", *1997 Communication Society Conference Lectures Papers*, vol. 2, pp. 145, Sep. 1997.

*Primary Examiner*—Brian Young
*Assistant Examiner*—John Nguyen
*Attorney, Agent, or Firm*—Scully, Scott, Murphy & Presser

[57] ABSTRACT

A message processing device for sending and receiving a message composed of one or more elements between different kinds of devices including a parse tree holding unit having a function of holding a parse tree generated from syntax descriptions which define structure of a message sent or received, a parse tree scanning unit connected to the parse tree holding unit and having a function of scanning the parse tree as message data to be processed is applied, encoding and decoding a value and outputting encoded and decoded values, a preamble processing unit connected to the parse tree scanning unit and having a function of processing a preamble field of a message for use in indicating whether an element exists or not in the message data sent or received, and an index processing unit connected to the parse tree scanning unit and having a function of processing an index field of a message for use in indicating what number of element is selected in the message data whose one of a plurality of elements is selected to be sent or received.

29 Claims, 34 Drawing Sheets

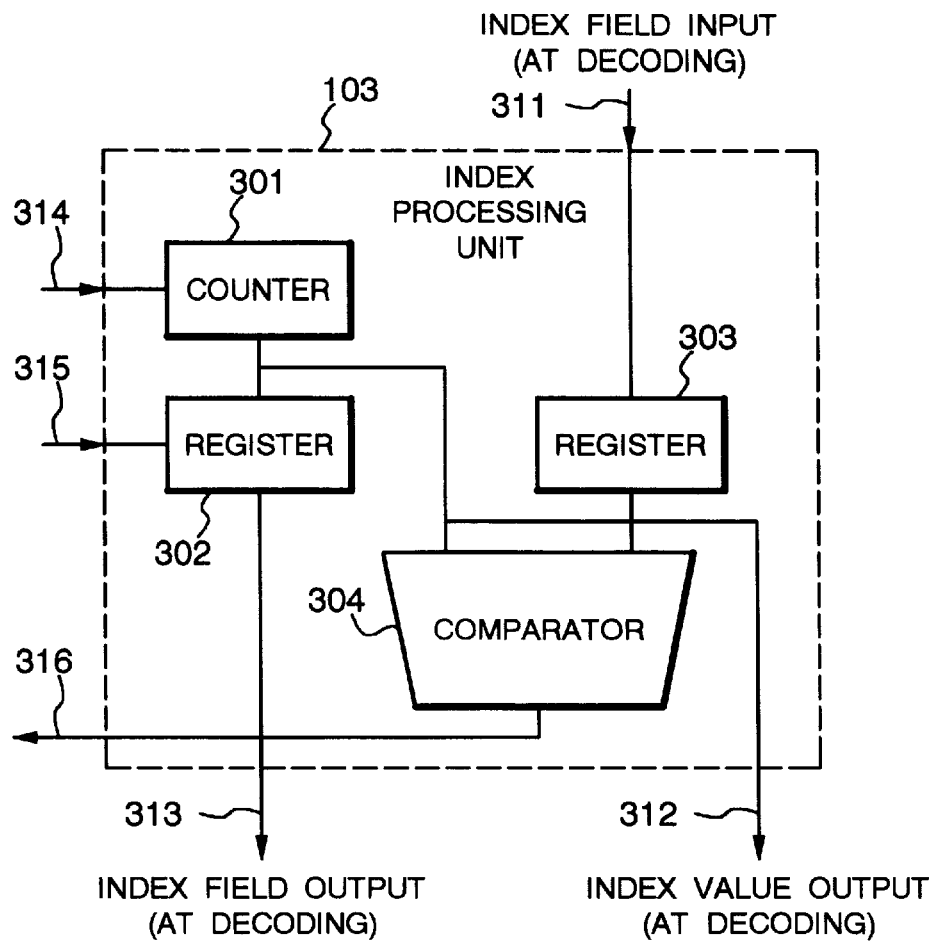

ASN.1 ABSTRACT SYNTAX   ASN.1 VALUE NOTATION

```
SampleSEQ ::= SEQUENCE{        {
    a INTEGER OPTIONAL,          a 10,
    b INTEGER OPTIONAL,          c 12,
    c INTEGER,                   d 8
    d INTEGER OPTIONAL         }
}
```

DECODING    ENCODING

ASN.1 TRANSFER SYNTAX

| 1 | 0 | 1 | ENCODING RESULT OF A | ENCODING RESULT OF C | ENCODING RESULT OF D |

PREAMBLE

FIG. 14

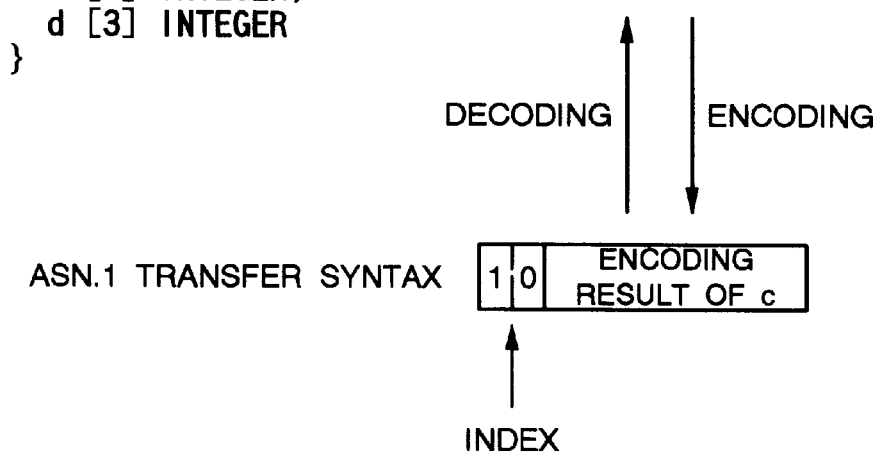

ASN.1 ABSTRACT SYNTAX

```
SampleCHO ::= CHOICE{
  a [0] INTEGER,
  b [1] INTEGER,
  c [2] INTEGER,
  d [3] INTEGER
}
```

ASN.1 VALUE NOTATION

```
{
  c 12,
}
```

DECODING    ENCODING

ASN.1 TRANSFER SYNTAX   | 1 | 0 | ENCODING RESULT OF c |

INDEX

FIG. 15

```
Example2 ::= SEQUENCE {
  id                      INTEGER(0..1023),
  subid    [0] IMPLICIT   INTEGER(0..1023) OPTIONAL,
  length   [1] IMPLICIT   INTEGER(0..255),
  header                  CHOICE{
    content-name   [0] PrintableString,
    content-type   [1] INTEGER(0..15)
  },
  content                 SEQUENCE {
    name                  PrintableString,
    age                   INTEGER(0..MAX)
  },
  trailer                 OCTET STRING(SIZE(0..15)) OPTIONAL
}
```

FIG. 16

| | | |
|---|---|---|
| { | | ~1601 |
| id | 3, | ~1602 |
| length | 4, | ~1603 |
| header | content-type : 4, | ~1604 |
| content { | | ~1605 |
| name | "foo" | ~1606 |
| age | 26 | ~1607 |
| }, | | ~1608 |
| trailer | ABCD'H | ~1609 |
| } | | ~1610 |

| BUFFER NO. | OUTPUT BUFFER OF PARSE TREE SCANNING UNIT | PREAMBLE BUFFER OF PREAMBLE PROCESSING UNIT | INDEX BUFFER OF INDEX PROCESSING UNIT |
|---|---|---|---|
| 0 : | EMPTY | EMPTY | 0 |

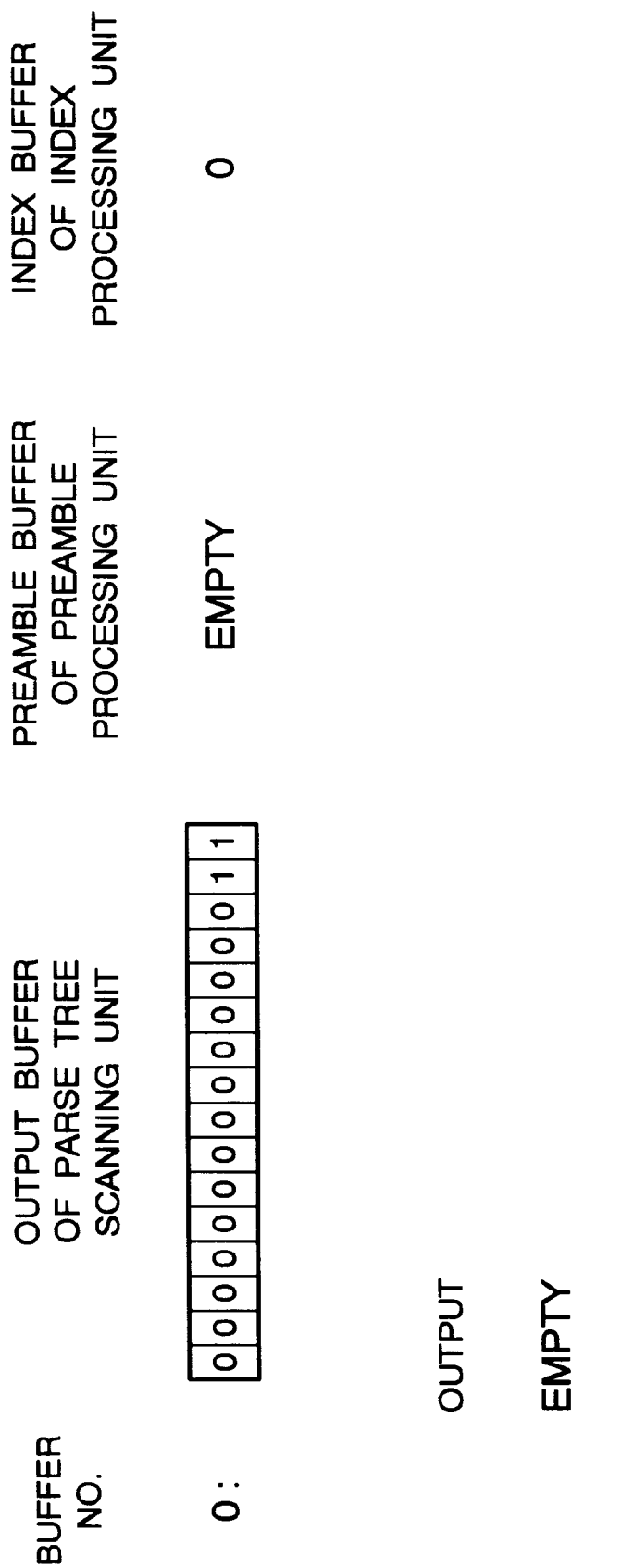

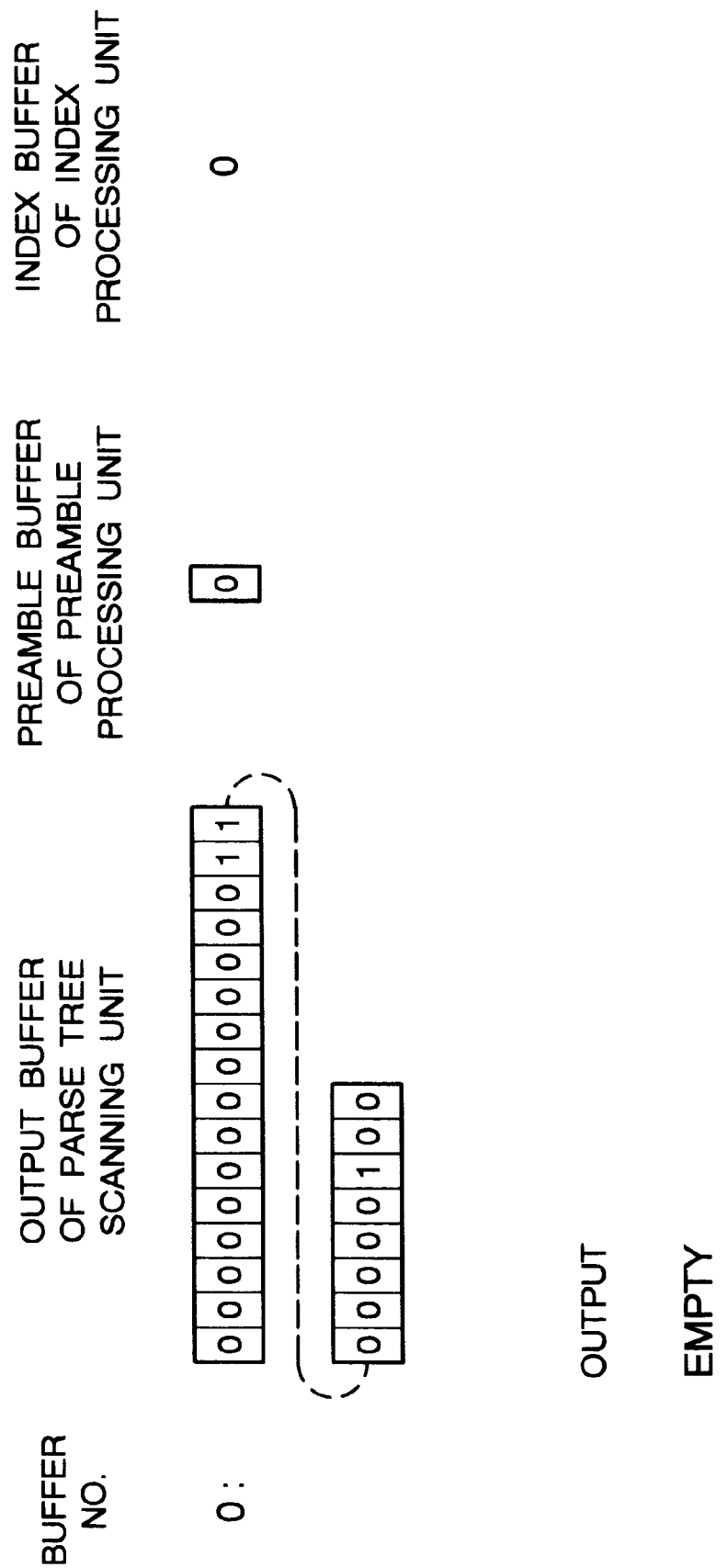

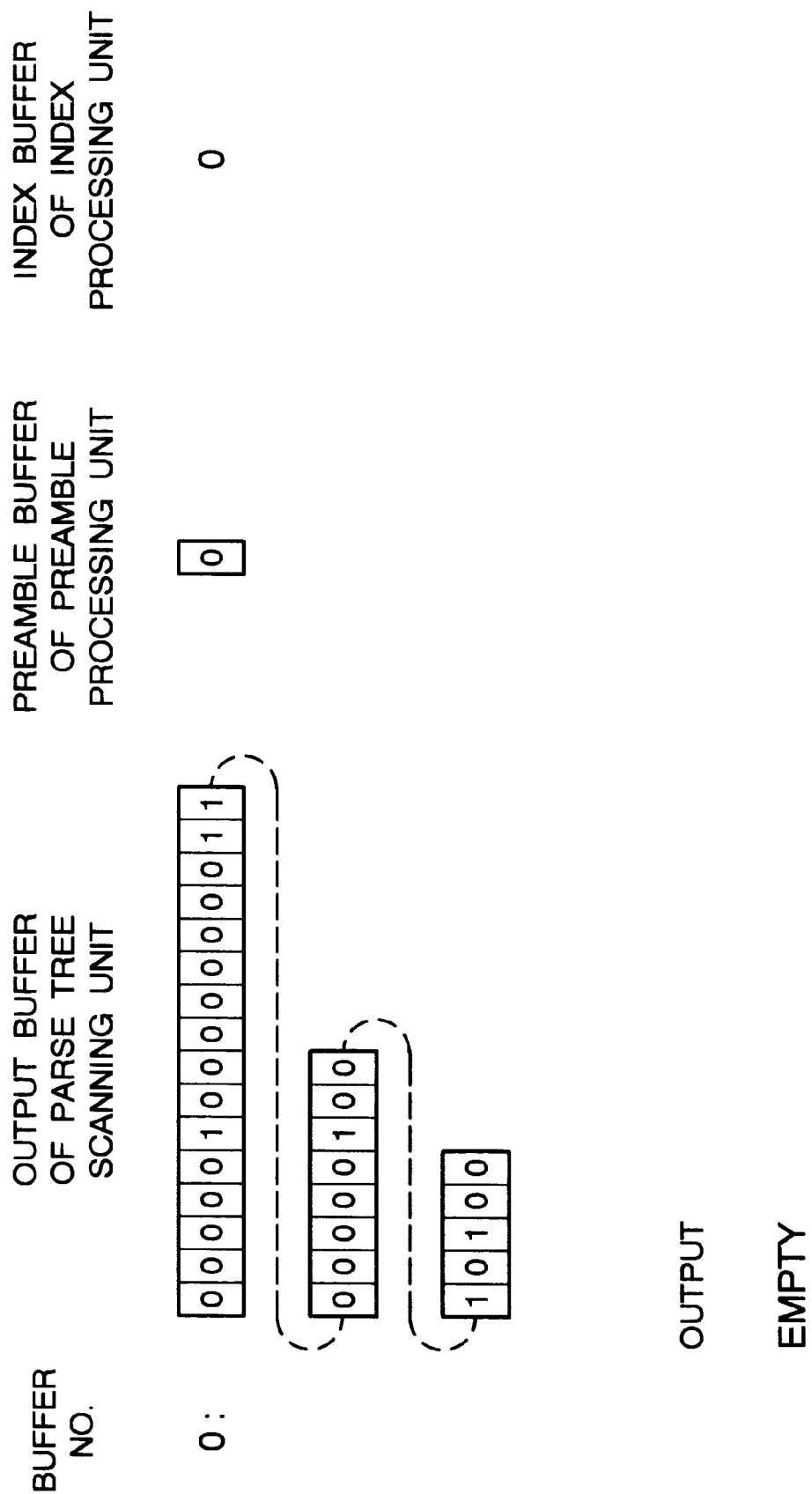

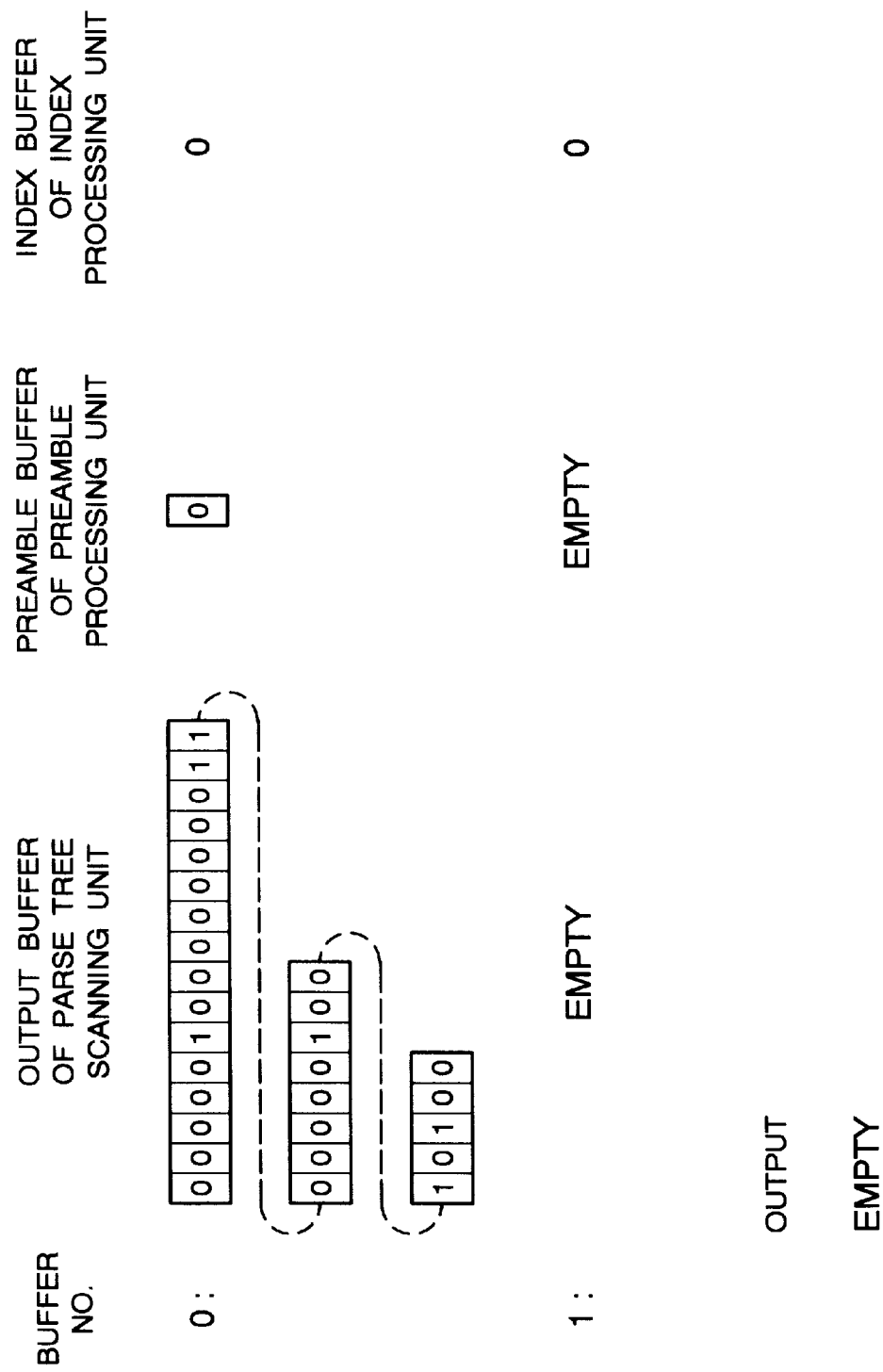

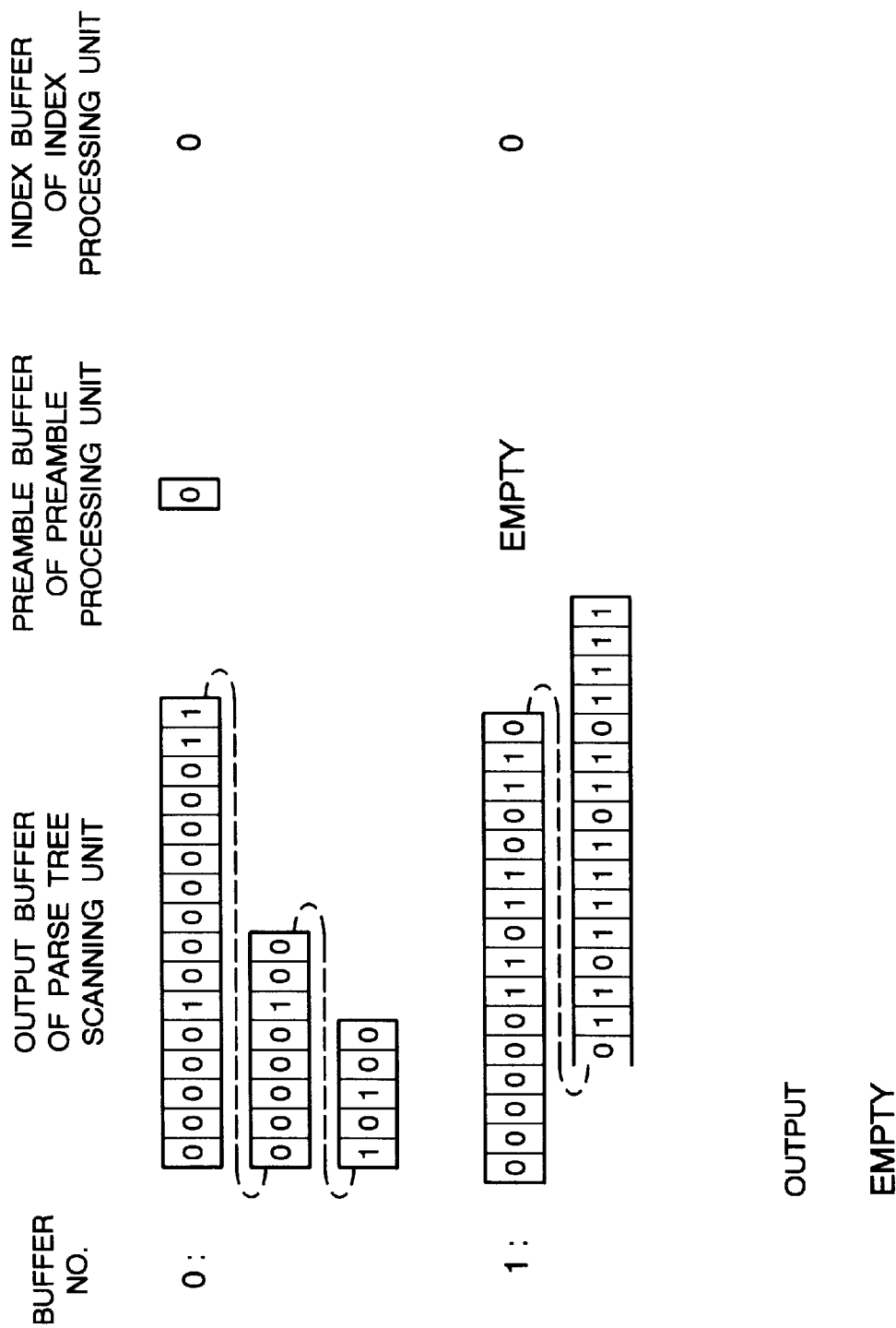

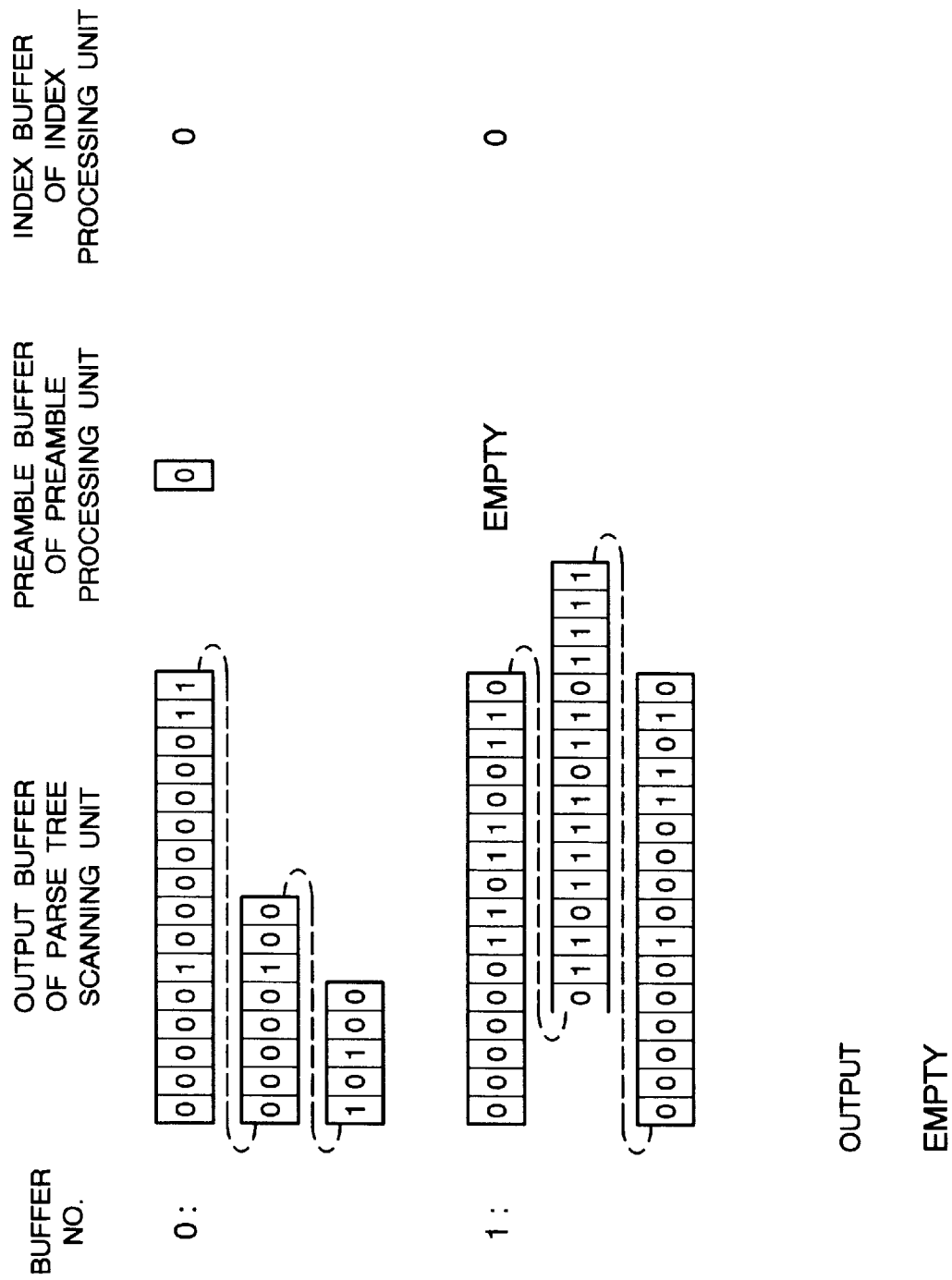

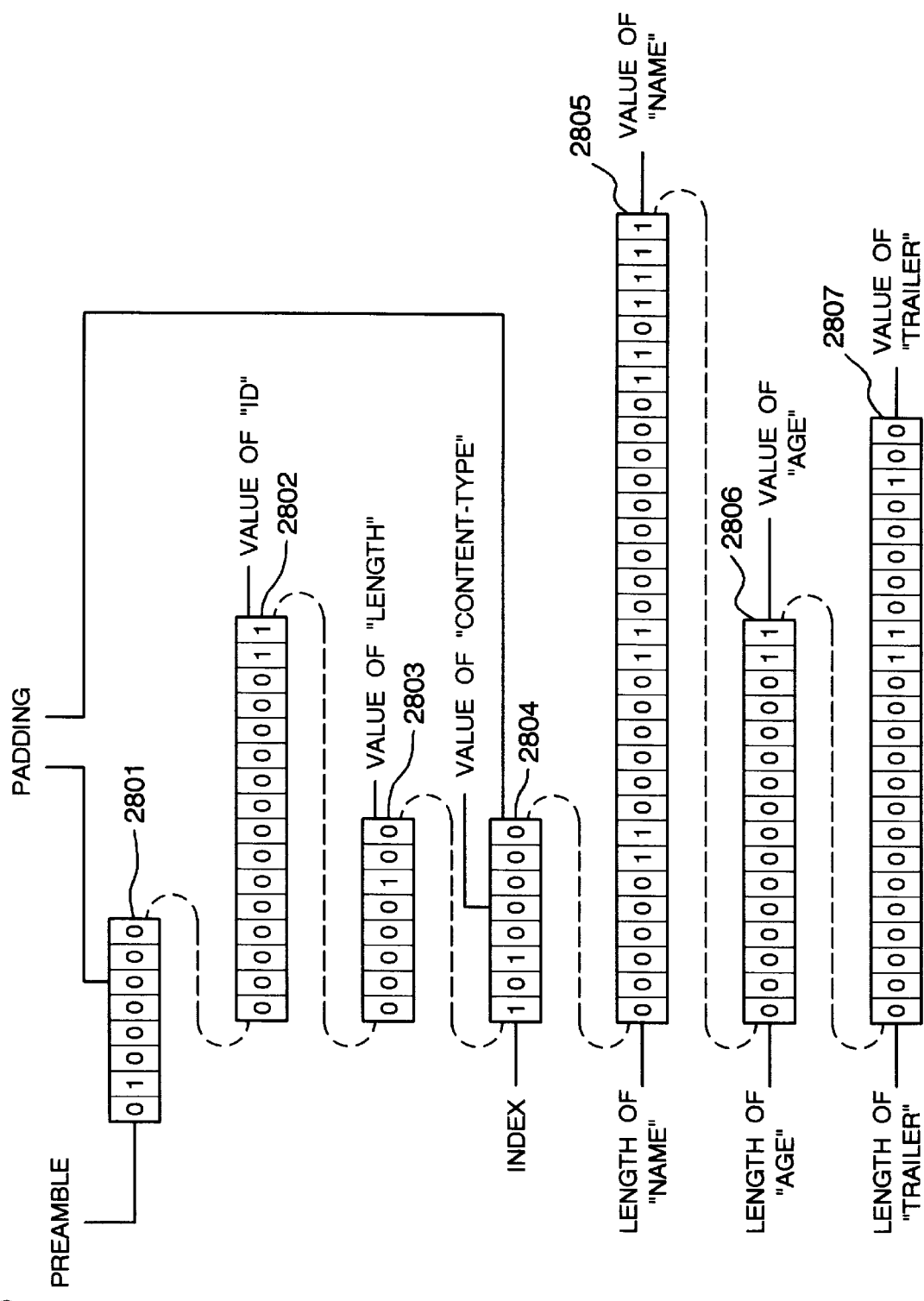

FIG. 29

| ADDRESS | type | tag | restrict | optdef | nextptr | succptr |
|---|---|---|---|---|---|---|
| BA+0 | | | | | | |
| BA+node | | | | | | |
| BA+node*2 | | | | | | |
| BA+node*3 | | | | | | |
| BA+node*4 | | | | | | |
| BA+node*5 | | | | | | |

. . .

| | |
|---|---|
| BA+node*(numnode-2) | |
| BA+node*(numnode-1) | |

LEGEND
BA: BASE ADDRESS OF STORAGE REGION
NODE: SUM OF TYPE, TAG, RESTRICT, OPTDEF, NEXTPTR AND SUCCPTR
NUMNODE: THE NUMBER OF NODES OF PARSING TREE
TYPE: SIZE OF STORAGE REGION NECESSARY FOR HOLDING ELEMENT TYPE
TAG: SIZE OF STORAGE REGION NECESSARY FOR HOLDING TAG ATTACHED TO ELEMENT
RESTRICT: SIZE OF STORAGE REGION NECESSARY FOR HOLDING CONSTRAINTS INFORMATION ATTACHED TO ELEMENT
OPTDEF: SIZE OF STORAGE REGION NECESSARY FOR HOLDING DESIGNATION AS OPTIONAL OR DESIGNATION AS DEFAULT
NEXTPTR: SIZE OF STORAGE REGION NECESSARY FOR HOLDING POINTER TO NEXT ELEMENT IN THE SAME NESTING HIERARCHY
SUCCPTR: SIZE OF STORAGE REGION NECESSARY FOR HOLDING POINTER TO ELEMENT IN LOWER NESTING HIERARCHY

FIG. 33 (PRIOR ART)

```
Example3 ::=SEQUENCE {
    id              INTEGER(0..63),
    subid   [0] IMPLICIT INTEGER(0..63) OPTIONAL,
    length  [1] IMPLICIT INTEGER(0..255),
    content         SEQUENCE {
        name        PrintableString,
        age         INTEGER(0..MAX)
    },
    trailer         OCTET STRING(SIZE(0..15))
}
```

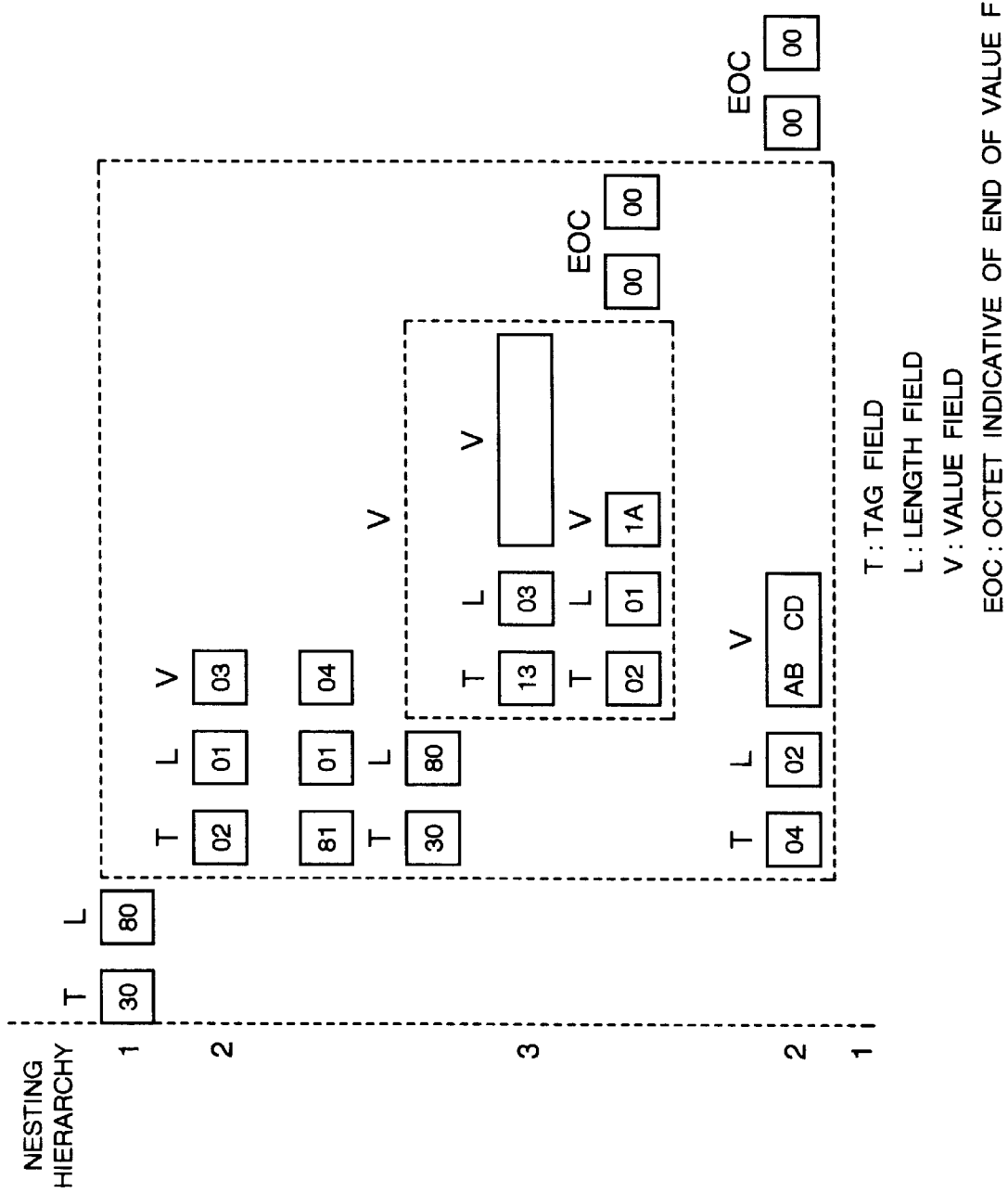

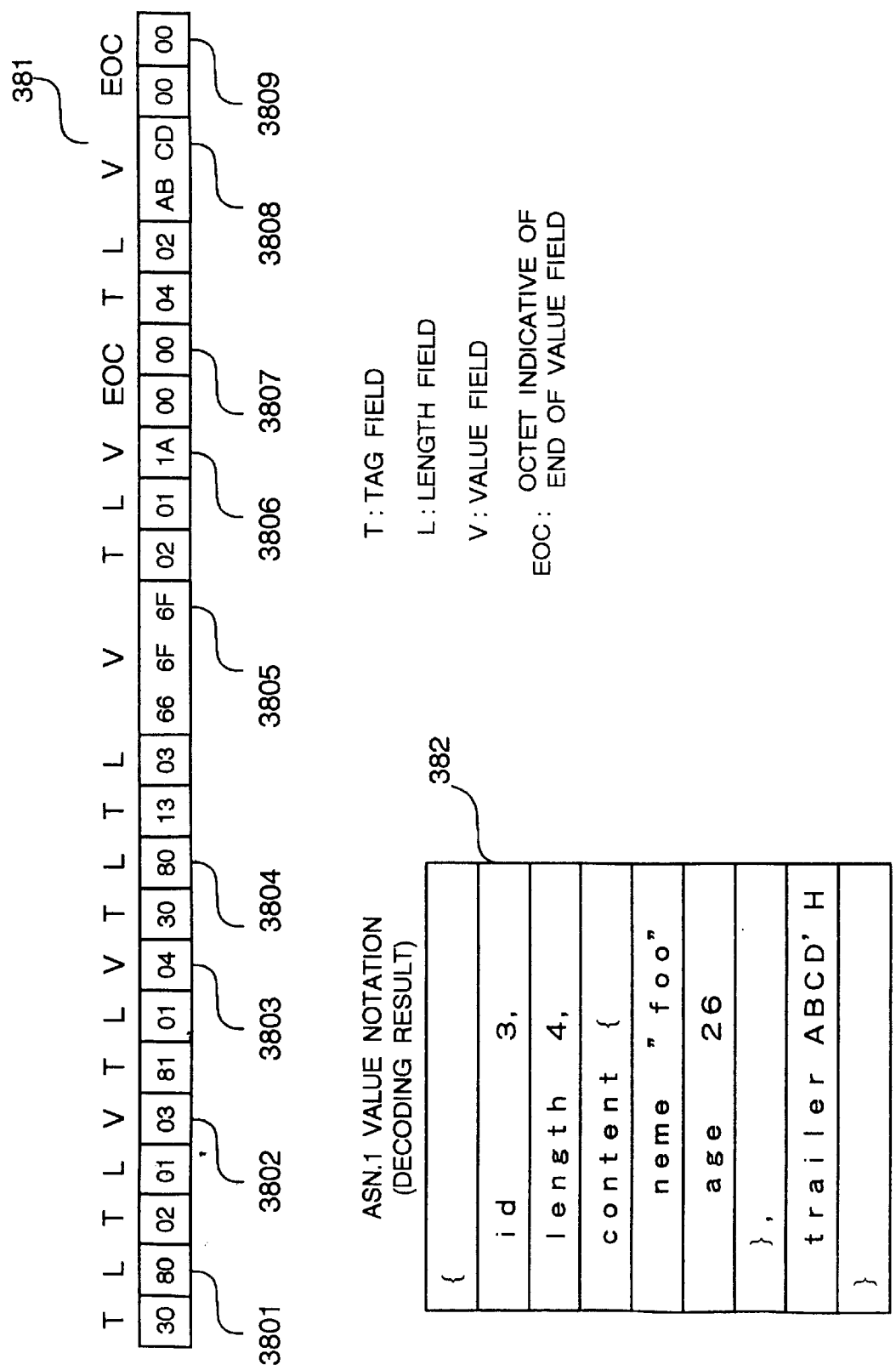

MESSAGE PROCESSING DEVICE AND METHOD THEREOF AND STORAGE MEDIUM STORING MESSAGE PROCESSING CONTROL PROGRAM

BACKGROUND OF THE INVENTION

Field of the Invention

The present invention relates to a message processing device and, more particularly, to a message processing device for processing messages defined by Abstract Syntax Notation One (hereinafter referred to as ASN.1) according to Packed Encoding Rules (hereinafter referred to as PER) and a method thereof, and a storage medium which stores a message processing control program.

Description of the Related Art

Message processing device of this kind is conventionally used in communication between different kinds of devices to encode a message to be sent into a format independent of a communication network and upon reception of a message encoded in a format independent of a network, decode the message into a format which can be handled at a reception side. This message processing device is widely used in the fields of file transfer systems (File Transfer, Access and Management, hereinafter referred to as FTAM) and network management. Because encoding and decoding procedures are conformed to the standards defined by International Organization for Standardization (hereinafter referred to as ISO), the application range of message processing devices is extremely wide.

Encoding and decoding procedures defined by ISO are roughly classified into two kinds. These are respectively called Basic Encoding Rules (hereinafter referred to as BER) (ISO/IEC 8825-1:1995 Information technology—ASN.1 encoding rules: Specification of Basic Encoding Rules (BER), Canonical Encoding Rules(CER) and Distinguished Encoding Rules (DER)) and Packed Encoding Rule (hereinafter referred to as PER) (ISO/IEC 8825-2:1996 Information technology—ASN.1 encoding rules: Specification of Packed Encoding Rules (PER)). BER and PER will be briefly described in the following.

At present, for encoding and decoding messages defined by ASN.1 abstract syntax, BER is widely employed. In BER, at the encoding of a message, three fields are generated for each element value, a tag field for identifying a type of element in question, a length field indicative of an octet length of an encoded value, and a value field for storing an actually encoded value. At the encoding of a constructor type value, nesting is also possible in which a value field again includes a tag field, a length field and a value field.

In BER, encoding results might be redundant in some cases because encoding of a value of each element is always conducted in a format of a tag field, a length field and a value field. PER is a technique of compressing an encoding result by generating neither a redundant tag field nor a redundant length field. PER has the following characteristics.

a) No tag field for identifying a type is generated.
b) A length field is generated only when a length of a value field can not be settled by ASN.1 abstract syntax descriptions or even if the length can be settled, when the value field becomes lengthy.
c) Encoding of a value of Boolean type and bit string type is conducted on a bit basis.
d) In the encoding of sequence-type and set-type values, information about whether its constituent element is designated as optional or default is encoded as a field called preamble.
e) In the encoding of a choice type, information indicating which element is chosen is encoded as a field called index.
f) In the encoding of the set type, encoding is started in ascending order of numbers of a tag (application tag, context-specific tag, etc.) attached to its element.
g) In a case where a constraint is imposed on a range of values of an integer type or the like, a result of the encoding of the value is compressed by using this constraint.
h) Transfer syntax has two kinds, aligned transfer syntax in which a bit-basis encoding result is padded to align on octet boundaries and unaligned transfer syntax without execution of padding.

Conventional message processing devices relate to BER among the above-described two kinds of encoding rules and as recited in Japanese Patent Laying-Open (Kokai) No. Heisei 1-198145, hold a parse tree generated from ASN.1 abstract syntax descriptions which define structure of a message to be encoded and scan said parse tree as a message to be processed is applied, thereby encoding the message into three fields, a tag field, a length field and a value field and decoding, or taking out a value corresponding to each element of abstract syntax from said three fields. The message processing device recited in "Institute of Electronics, Information and Communication Engineers of Japan, 1997 National Conference Lectures Papers (Communication 2), pp.148, March, 1997, and "Institute of Electronics, Information and Communication Engineers of Japan, 1997 Communication Society Conference Lectures Papers, Vol. 2, pp. 145, September, 1997, realizes message processing by hardware by generating, from said parse tree, a finite-state machine (hereinafter referred to as FSM) corresponding to the tree and using the FSM at the encoding and decoding.

One example of conventional message processing devices will be described with reference to a drawing. Schematic block diagram of structure of a conventional message processing device is shown in FIG. 32. As illustrated in FIG. 32, a conventional message processing device 32 includes a parse tree scanning unit 3201 and a parse tree holding unit 3202.

The parse tree holding unit 3202 has a function of holding a parse tree 3203 generated from an ASN.1 abstract syntax description 3206. The parse tree scanning unit 3201 has a function of, upon application of an ASN.1 value notation 3204 (message to be processed), scanning the parse tree 3203 and encoding a value to generate an ASN.1 transfer syntax 3205 (encoding result), as well as a function of, upon application of the ASN.1 transfer syntax 3205 (message to be processed), scanning the parse tree 3203 and decoding a value to generate the ASN.1 value notation 3204 (decoding result).

Next, ASN.1 abstract syntax will be briefly described. Example of ASN.1 abstract syntax is shown in FIG. 33. Descriptions in FIG. 33 define the structure of a message Example 3 and indicate that Example 3 is of the sequence type made of a sequence of five elements, "id", "subid", "length", "content" and "trailer". In addition, "id", "subid" and "length" are of the integer type, "content" is of the sequence type and "trailer" is of an octet string type. As can be seen from the fact that "content" is defined as the sequence type, in ASN.1 abstract syntax, definition to have nesting is possible and accordingly, a sequence-type element can be again of the sequence type.

To the element "subid" and the element "length", [0] and [1] as context-specific tags are attached. In message processing according to BER, use of a context-specific tag prevents a plurality of elements of the same type from failing to exactly correlate with their corresponding values. For example, because both of the element "subid" and the element "length" are of the integer type and the element "subid" is designated as optional, when a value corresponding to the element "subid" is omitted in the ASN.1 value notation which will be described in the following, use of the context-specific tags attached to the element "subid" and the element "length" enables the element "length" and its corresponding value to properly correlate with each other.

Also, the element "subid" is designated as optional, which indicates that in the ASN.1 value notation, a value corresponding to the element "subid" can be omitted. The elements "subid" and "length" are further designated as implicit, which indicates that in the encoding according to BER, encoding is conducted as to tags attached to the elements in question (here, context-specific tags [0] and [1]), while no encoding is conducted as to a tag indicative of a data type (integer type, here) of the elements in question. In addition to these, as to the elements "id", "subid", "length" and "age", constraints are imposed on a range of obtainable values in the ASN.1 value notation. As to the element "id", for example, the obtainable values range from not less than 0 to not more than 63. As to the element "trailer", a constraint is imposed on a range of lengths of an octet string of a value and the lengths range from not less than 0 to not more than 15. In a message processing device related to BER, these constraints are not used in encoding and decoding.

FIG. 34 shows one example of specific values corresponding to a message defined by the ASN.1 abstract syntax shown in FIG. 33, which is called value notation. More specifically, "id" which is an integer-type element corresponds to the value 3 and other elements have similar corresponding relations.

Next, brief description will be made of a parse tree for use in a conventional message processing device. FIG. 35 shows a parse tree generated from the ASN.1 abstract syntax descriptions in FIG. 33. The parse tree represents the structure of a message defined by the ASN.1 abstract syntax descriptions as tree structure. Each node of the parse tree is composed of six fields which respectively represent "a type of element corresponding to a node in question", "a tag attached to the element corresponding to the node in question", "whether the element corresponding to the node in question is designated as implicit", "whether the element corresponding to the node in question is designated as optional or default", "a pointer to a subsequent node in the same nesting hierarchy" and "a pointer to a node in a lower nesting hierarchy".

In the following, how a message is handled by a conventional message processing device will be specifically described.

First, description will be made of message encoding. FIG. 36 shows a flow of message encoding by a conventional message processing device.

In the message processing device 32, at a time point of starting encoding processing, the parse tree scanning unit 3201 is ready to scan a node 3501 as a root node of the parse tree. The message processing device 32 starts the processing upon reception of an input message to be processed. In the following, how encoding is conducted by the message processing device 32 will be described for each step with reference to FIGS. 34, 35 and 36. As a flow of encoding, the message illustrated in FIG. 36 is generated as the parse tree of FIG. 35 is scanned in response to the reception of the message of FIG. 34.

Step 1 (at a time point of reception of a message up to 3401)

The parse tree scanning unit 3201 scans the node 3501 of the parse tree to sense that the input message Example 3 is of the sequence type. Therefore, a tag field '30' corresponding to the sequence type is generated. Also, because the sequence type is of the constructor type, as to a length field, an octet '80' indicating that a length is unsettled is generated (3601 of FIG. 36).

Step 2 (at a time point of reception of a message up to 3402)

The parse tree scanning unit 3201 scans a node 3502 of the parse tree to sense that the element "id" is of the integer type. Therefore, a tag field '02' corresponding to the integer type is generated. In addition, because the value is 3, a length field '01' and a value field '03' are generated (3602 of FIG. 36).

Step 3 (at a time point of reception of a message up to 3403)

The parse tree scanning unit 3201 scans a node 3503 of the parse tree to sense that the element "subid" is of the integer type, that it is designated as optional and designated also as implicit, and that a context-specific tag "0" is attached. Here, since the input element is "length" (not "subid"), the parse tree scanning unit 3201 scans a node 3504 of the parse tree to sense that the "length" is of the integer type, that it is designated as implicit and that a context-specific tag [1] is attached. Therefore, a tag field '81' corresponding to the context-specific tag [1] is generated. In addition, since the value is 4, the length field '01' and a value field '04' are generated (3603 of FIG. 36).

Step 4 (at a time point of reception of a message up to 3404)

The parse tree scanning unit 3201 scans a node 3505 of the parse tree to sense that "content" is of the sequence type. Therefore, the tag field '30' corresponding to the sequence type is generated. In addition, since the sequence type is of the constructor type, the octet '80' indicating that the length is unsettled is generated with respect to a length field (3604 of FIG. 36).

Step 5 (at a time point of reception of a message up to 3405)

The parse tree scanning unit 3201 scans a node 3506 of the parse tree to sense that "name" is of a printable string type. Therefore, a tag field '13' corresponding to the printable string type is generated. In addition, since the value is "foo", a length field '03' and a value field '666F6F' are generated (3605 of FIG. 36).

Step 6 (at a time point of reception of a message up to 3406)

The parse tree scanning unit 3201 scans a node 3507 of the parse tree to sense that "age" is of the integer type. Therefore, the tag field '02' corresponding to the integer type is generated. In addition, since the value is 26, the length field '01' and a value field '1A' are generated (3606 of FIG. 36).

Step 7 (at a time point of reception of a message up to 3407)

The parse tree scanning unit 3201 senses that scanning of a subtree with the node 3505 as a root is all completed to generate a value field end octet '0000' corresponding to the length unsettled octet '80' generated at Step 4 and add the same to the trail (3607 of FIG. 36).

Step 8 (at a time point of reception of a message up to 3408)

The parse tree scanning unit 3201 scans a node 3508 of the parse tree to sense that the element "trailer" is of the octet string type. Therefore, a tag field '04' corresponding to the octet string type is generated. In addition, since the value is ABCD'H, a length field '02' and a value field 'ABCD' are generated (3608 of FIG. 36).

Step 9 (at a time point of reception of a message up to 3409)

The parse tree scanning unit 3201 senses that scanning of the parse tree is all finished to generate the value field end octet '0000' corresponding to the length unsettled octet '80' generated at Step 1 and add the same to the trail. (3609 of FIG. 36).

Final results of the encoding of the message illustrated in FIG. 34 by the conventional message processing device 32 are shown in FIG. 37. In FIG. 37, illustrated is a shaped octet string of the results in order to make clear nesting hierarchies of the encoded message. As shown in FIG. 37, the encoded message has each element composed of three fields, a tag (T), a length (L) and a value (V).

Next, decoding of a message will be described. FIG. 38 shows input data (ASN.1 transfer syntax 381) to the conventional message processing device 32 and a decoding result (ASN.1 value notation 382) in the case of decoding. The structure of the ASN.1 value notation 382 is defined by the ASN.1 abstract syntax of FIG. 33. In the following, how decoding is conducted by the conventional message processing device 32 will be described for each step with reference to FIG. 35 and FIG. 38. As a flow of decoding, the ASN.1 value notation 382 of FIG. 38 is generated as the parse tree of FIG. 35 is scanned in response to the reception of the ASN.1 transfer syntax 381.

Step 1 (at a time point of reception of a message up to 3801)

Upon reception of a tag field '30', the parse tree scanning unit 3201 scans the node 3501 of the parse tree to sense that '30' denotes a tag indicative of the sequence type. Accordingly, a symbol '{' indicative of the start of a sequence-type value is generated. Next, upon reception of a length field '80', the unit 3201 senses that '80' denotes an octet indicating that the length is unsettled (3811 of FIG. 38).

Step 2 (at a time point of reception of a message up to 3802)

Upon reception of a tag field '02', the parse tree scanning unit 3201 scans the node 3502 of the parse tree to sense that '02' denotes a tag indicative of the integer type. Next, upon reception of a length field '01', the unit 3201 senses that a length of the value field is one octet. Accordingly, the unit 3201 further reads one octet '03' to decode as the value 3 corresponding to the element "id" (3812 of FIG. 38).

Step 3 (at a time point of reception of a message up to 3803)

Upon reception of a tag field '81', the parse tree scanning unit 3201 scans the node 3503 of the parse tree to sense that '80' denotes a tag indicative of the context-specific tag [0]. Since here input tag field is not '80', the parse tree scanning unit 3201 scans the node 3504 of the parse tree to sense that '81' denotes a tag indicative of the context-specific tag [1]. Next, upon reception of the length field '01', the unit 3201 senses that the length of the value field is one octet. Therefore, the unit 3201 further reads one octet '04' to decode as the value 4 corresponding to the element "length" (3813 of FIG. 38).

Step 4 (at a time point of reception of a message up to 3804)

Upon reception of the tag field '30', the parse tree scanning unit 3201 scans the node 3505 of the parse tree to sense that '30' denotes a tag indicative of the sequence type. The symbol '{' indicative of the start of the sequence type is accordingly generated. Next, upon reception of the length field '80', the unit 3201 senses that '80' denotes an octet indicating that the length is unsettled (3814 of FIG. 38).

Step 5 (at a time of reception of a message up to 3805)

Upon reception of a tag field '13', the parse tree scanning unit 3201 scans the node 3506 of the parse tree to sense that '13' denotes a tag indicative of the printable string type. Next, upon reception of a length field '03', the unit 3201 senses that the length of the value field is three octets. Accordingly, the unit 3201 further reads subsequent three octets '666F6F' to decode as the value "foo" corresponding to the element "name" (3815 of FIG. 38).

Step 6 (at a time point of reception of a message up to 3806)

Upon reception of the tag field '02', the parse tree scanning unit 3201 scans the node 3507 of the parse tree to sense that '02' denotes a tag indicative of the integer type. Next, upon reception of the length field '01', the unit 3201 senses that the length of the value field is one octet. Therefore, the unit 3201 further reads subsequent one octet '1A' to decode as the value 26 corresponding to the element "age" (3816 of FIG. 38).

Step 7 (at a time point of reception of a message up to 3807)

Upon reception of a field '0000', the parse tree scanning unit 3201 senses that this denotes an octet indicative of the end of the value field. Therefore, the symbol '}' indicative of the end of the sequence type is generated (3817 of FIG. 38).

Step 8 (at a time point of reception of a message up to 3808)

Upon reception of a tag field '04', the parse tree scanning unit 3201 scans the node 3508 of the parse tree to sense that '04' denotes a tag indicative of the octet string type. Next, upon reception of a length field '02', the unit 3201 senses that the length of the value field is two octets. Accordingly, the unit 3201 further reads subsequent two octets 'ABCD' to decode as the value ABCD'H corresponding to the element "trailer" (3818 of FIG. 38).

Step 9 (at a time point of reception of a message up to 3809)

Upon reception of the field '0000', the parse tree scanning unit 3201 senses that this is an octet indicative of the end of the value field. Therefore, the symbol 'i' indicative of the end of the sequence type is generated (3819 of FIG. 38).

Final results of the decoding of the ASN.1 transfer syntax 381 of FIG. 38 by the conventional message processing device 32 are as illustrated in the ASN.1 value notation 382 of FIG. 38.

As described so far, the conventional message processing devices conform to BER as message encoding rules (encoding and decoding procedures). More specifically, the devices premise that at the encoding of a message, a tag field, a length field and a value field are generated for each element and at the decoding, an input message is composed of the above-described three fields. With the conventional message processing devices, therefore, it is impossible to encode and decode a message according to other encoding rules than BER and accordingly has such problems as mentioned in the following.

The first problem is that since in a conventional message processing device conformed to BER, encoding is always conducted for each element in the format of a tag field, a length field and a value field, existence of redundant tag field and length field is inevitable.

Another problem is that since even when obtainable values in ASN.1 abstract syntax are limited, this limitation is not at all taken into consideration, and therefore the contents of a value field can not be compressed. At the exchange of a message defined by the ASN.1 abstract syntax between different kinds of devices, when a channel for exchanging the message has an idle capacity, use of BER which involves generation of a redundant field will not cause a serious problem, while when constraints are imposed on a capacity of a channel, there will occur a case where it is required to prevent generation of a redundant field and send and receive a value compressed as much as possible. However, the conventional message processing devices can not meet such demands as mentioned above because they are allowed to use only BER as encoding rules.

The second problem is that with conventional message processing devices, there is a possibility that in an application requiring high-speed data transfer, satisfactory processing performance can not be obtained. The reason is that since even if the contents of tag, length and value fields are redundant, the conventional message processing devices are not allowed to refrain from generating the above-described fields, resulting in increasing a time overhead for generating redundant fields.

The third problem is that use of the conventional message processing devices needs a large amount of storage region for storing a message to be processed and temporal data being processed. The reason is that since even if the contents of tag, length and value fields are redundant, the conventional message processing devices are not allowed to refrain from generating the above-described fields, from when a redundant field is generated until when the same is output to a user of the message processing devices, an overhead in a region for holding a message containing a redundant field within the device is large.

The fourth problem is that with the conventional message processing devices, a delay time is long from when a message to be processed is applied to the message processing device by a user of the device until when desired output is obtained. The reason is that since the conventional message processing devices are not allowed to refrain from generating tag, length and value fields even if the contents of said fields are redundant, and therefore a time overhead for generating redundant fields is large. In a real-time system etc., stringent constraints might be imposed in some cases on a time from when a message to be processed is applied to the device by a user of the device until when a response (processing result) is obtained and in such a case, use of the conventional message processing device might cause serious inconvenience.

SUMMARY OF THE INVENTION

A first object of the present invention is to provide a message processing device capable of handling compressed encoding data and, more particularly, a message processing device capable of encoding and decoding a message according to PER and a method therefor.

A second object of the present invention is to provide a message processing device enabling reduction in a volume of data sent and received in an environment in which messages are sent and received between different kinds of devices and a method therefor.

A third object of the present invention is to provide a message processing device which can achieve satisfactory performance even in an application requiring high-speed data transfer by generating neither a redundant tag field nor a length field to eliminate a time overhead for generating a redundant field and a method therefor.

A fourth object of the present invention is to provide a message processing device capable of encoding and decoding a message even with a smaller storage region and a method therefor.

A fifth object of the present invention is to provide a message processing device enabling a delay time to be minimized from when a message to be processed is applied to the device until when a desired result is obtained and a method therefor.

According to the first aspect of the invention, a message processing device for sending and receiving a message composed of one or more elements between different kinds of devices, comprises parse tree holding means having a function of holding a parse tree generated from syntax descriptions defining structure of a message sent or received, parse tree scanning means connected to the parse tree holding means and having a function of, as message data to be processed is applied, scanning the parse tree to encode and decode a value and outputting encoded and decoded values, preamble processing means connected to the parse tree scanning means and having a function of processing a preamble field of a message for use in indicating whether an element exists or not in message data sent or received, and index processing means connected to the parse tree scanning means and having a function of processing an index field of a message for use in indicating what number of element is selected in message data whose one of a plurality of elements is selected to be sent or received.

In the preferred construction, the preamble Processing means comprises a counter having a function of receiving input of a signal indicating whether a node being scanned is omissible and when the signal indicates that the node is omissible, counting up a count value and outputting the count value to a decoder which will be described later, a decoder having a function of decoding a count value of the counter and outputting the decoded value as a write enable signal to each of flip-flops constituting a register which will be described later, a first multiplexer having a function of receiving input of a signal indicating which processing of encoding and decoding is being executed, and when the signal indicates encoding, outputting a signal indicating whether an element corresponding to a node in the parse tree being scanned exists or not to a register which will be described later and when the signal indicates decoding, outputting a preamble field input signal to the register which will be described later, a register having a function of receiving input of the signal from the first multiplexer and the write enable signal from the decoder, and for a flip-flop to which the write enable signal is effective, reading the signal from the multiplexer and holding the contents of the signal and for a flip-flop to which the write enable signal is not effective, keeping holding the currently held contents, as well as outputting the currently held contents as a preamble field output signal, and a second multiplexer having a function of receiving input of the preamble field output signal from the register and the count value from the counter and outputting the contents of a bit at a bit position corresponding to the count value in a preamble field as an instruction signal giving an instruction to decode an element corresponding to the subsequent node.

In another preferred construction, the index processing means comprises a counter having a function of receiving input of a signal indicating whether a node of the parse tree corresponding to a message whose one of a plurality of elements is selected to be sent or received is being scanned and when the node in question is being scanned, counting up a count value and outputting the count value to a first register and a comparator which will be described later, as well as outputting the count value as an index value output signal, a first register having a function of receiving input of the count value and a signal indicating whether a node corresponding to a selected element of a message whose one of a plurality of elements is selected to be sent or received is being scanned or not, and when the node in question is being scanned, outputting the currently held contents as an index field output signal and when the node in question is not being scanned, holding the count value, a second register having a function of receiving input of an index field input signal and holding the index field input signal, as well as outputting the currently held contents to a comparator which will be described later, and a comparator having a function of receiving input of the count value and the signal from the second register and comparing the contents of the two, and when the contents coincide with each other, outputting an instruction signal giving an instruction to decode a value of an element corresponding to a node of the parse tree corresponding to the currently output index value.

In another preferred construction, the preamble processing means handles a preamble to instruct the parse tree scanning means to scan only a node of the parse tree corresponding to an element existing in message data sent or received, thereby eliminating the need of scanning of a node whose scanning is not required.

In another preferred construction, the preamble processing means comprises a counter having a function of receiving input of a signal indicating whether a node being scanned is omissible and when the signal indicates that the node is omissible, counting up a count value and outputting the count value to a decoder which will be described later, a decoder having a function of decoding a count value of the counter and outputting the decoded value as a write enable signal to each of flip-flops constituting a register which will be described later, a first multiplexer having a function of receiving input of a signal indicating which processing of encoding and decoding is being executed, and when the signal indicates encoding, outputting a signal indicating whether an element corresponding to a node in the parse tree being scanned exists or not to a register which will be described later and when the signal indicates decoding, outputting a preamble field input signal to the register which will be described later, a register having a function of receiving input of the signals from the first multiplexer and the write enable signal from the decoder, and for a flip-flop to which the write enable signal is effective, reading the signal from the multiplexer and holding the contents of the signal and for a flip-flop to which the write enable signal is not effective, keeping holding the currently held contents, as well as outputting the currently held contents as a preamble field output signal, and a second multiplexer having a function of receiving input of the preamble field output signal from the register and the count value from the counter and outputting the contents of a bit at a bit position corresponding to the count value in a preamble field as an instruction signal giving an instruction to decode an element corresponding to the subsequent node, and the preamble processing means handles a preamble to instruct the parse tree scanning means to scan only a node of the parse tree corresponding to an element existing in message data sent or received, thereby eliminating the need of scanning of a node whose scanning is not required.

In another preferred construction, in the encoding of a message, when message data is applied, examination is made whether an element yet to be encoded exists in the message data or not, when there is no element yet to be encoded, an encoding result of each element linked after a preamble is output as an encoding result, when an element yet to be encoded exists, the parse tree scanning means scans a subsequent node of the parse tree to examine whether the element in question is an omissible element or not, when the element in question is not an omissible element, the parse tree scanning means examines whether the node in question is a node corresponding to the element yet to be encoded and when the node in question is not the corresponding node, the routine again returns to the examination whether an element yet to be encoded exists or not, when the node is the corresponding node, the element in question is encoded to again return to the examination whether an element yet to be encoded exists or not, when the element in question is an omissible element, the parse tree scanning means gives an instruction to the preamble processing means to generate a 1-bit field in the preamble processing means which field is then linked to the trail of the existing preamble and the parse tree scanning means examines whether the node in question is a node corresponding to the element yet to be encoded, and when the node is not the corresponding node, the parse tree scanning means gives an instruction to the preamble processing means to set the contents of the field generated in the preamble processing means to the contents indicating that "omissible element is omitted" and again return to the examination whether an element yet to be encoded exists, and when the node in question is a node corresponding to the element yet to be encoded, the parse tree scanning means gives an instruction to the preamble processing means to set the contents of the field generated in the preamble processing means to the contents indicating that "omissible element is not omitted" and encodes the element in question to again return to the examination whether an element yet to be encoded exists.

In another preferred construction, in the decoding of a message, when message data is applied, first a preamble field is read and stored in the preamble processing means, a variable indicative of a bit position in the preamble field is initialized to 0, examination is made whether there exists an element yet to be decoded in the message data, when no element yet to be decoded exists, a decoding result of each element is output, when an element yet to be decoded exists, the parse tree scanning means scans the subsequent node of the parse tree to examine whether an element corresponding to the node in question is an omissible element and when the element in question is not an omissible element, decodes the element in question to again return to the examination whether an element yet to be decoded exists, when the element in question is an omissible element, if the contents of the current bit position in the preamble field indicate that "omissible element is omitted", 1 is added to a variable indicative of the current bit position to return to the examination whether an element yet to be decoded exists, and if the contents of the current bit position in the preamble field indicate that "omissible element is not omitted", the element in question is decoded and 1 is added to the variable indicative of the current bit position to return to the examination whether an element yet to be decoded exists.

In another preferred construction, the preamble processing means handles a preamble to instruct the parse tree scanning means to scan only a node of the parse tree corresponding to an element existing in message data sent or received, thereby eliminating the need of scanning of a node whose scanning is not required, the parse tree is stored in a continuous region on a storage region of the parse tree holding means, and in the decoding of a message, when message data is applied, first a preamble field is read and stored in the preamble processing means, a variable indicative of a bit position in the preamble field is initialized to 0, an address of a node being currently scanned is stored in a variable indicative of an address of a node of the parse tree, examination is made whether there exists an element yet to be decoded in the message data, when no element yet to be decoded exists, a decoding result of each element is output, when an element yet to be decoded exists, examination is made whether the element in question is an omissible element and when the element in question is not an omissible element, an address of the subsequent node is stored in the variable indicative of an address of a node of the parse tree, the node of the parse tree having the address in question is scanned and the element in question is decoded to return to the examination whether an element yet to be decoded exists, when the element in question is an omissible element, if the contents of the current bit position in the preamble field indicate that "omissible element is omitted", the address of the subsequent node is stored in the variable indicative of an address of a node of the parse tree and 1 is added to a variable indicative of the current bit position to return to the examination whether an element yet to be decoded exists, and if the contents of the current bit position in the preamble field indicate that "omissible element is not omitted", the address of the subsequent node is stored in the variable indicative of an address of a node of the parse tree, the node of the parse tree having the address in question is scanned, the element in question is decoded and 1 is added to the variable indicative of the current bit position to return to the examination whether an element yet to be decoded exists.

In another preferred construction, the index processing means handles an index to instruct the parse tree scanning means to scan only a node of the parse tree corresponding to a selected element in message data sent or received, thereby eliminating the need of scanning of a node whose scanning is not required.

In another preferred construction, in the encoding of a messages when message data is applied, examination is made whether a node of the parse tree being currently scanned is a node corresponding to a selected element and when the node is not the corresponding node, the index processing means adds I to a current index value and the parse tree scanning means scans the subsequent node of the parse tree to again return to the examination whether the node being scanned corresponds to the selected element, and when the node is the corresponding node, the index processing means encodes the current index value and the parse tree scanning means encodes the element in question to output the encoding results of the index value and the element in question linked together.

In another preferred construction, in the decoding of a message, when message data is applied, first an index field is read and stored in the index processing means, the contents of the index field are decoded to obtain an index value, a variable indicative of a choice number is initialized to 0, the parse tree scanning means scans a subsequent node of the parse tree, examination is made whether the variable and the index value are equal and if the two values are not equal; 1 is added to the variable to again return to scanning of a subsequent node of the parse tree, and when the variable and the index value are equal, the element in question is decoded.

In another preferred construction, the index processing means handles an index to instruct the parse tree scanning means to scan only a node of the parse tree corresponding to a selected element in message data sent or received, thereby eliminating the need of scanning of a node whose scanning is not required, the parse tree is stored in a continuous region on a storage region of the parse tree holding means, and in the decoding of a message, when message data is applied, first an index field is read and stored in the index processing means, the contents of the index field are decoded to obtain an index value, an address of a node being currently scanned is stored in a variable indicative of an address of a node of the parse tree, and the parse tree scanning means scans a node of the parse tree to be referred to by a sum of the variable and a product of the size of a storage region necessary for holding one node of the parse tree and the index value to decode the element in question.

In another preferred construction, the preamble processing means handles a preamble to instruct the parse tree scanning means to scan only a node of the parse tree corresponding to an element existing in message data sent or received, and the index processing means handles an index to instruct the parse tree scanning means to scan only a node of the parse tree corresponding to a selected element in message data sent or received, thereby eliminating the need of scanning of a node whose scanning is not required.

In another preferred construction, the parse tree holding means holds such a parse tree generated from syntax descriptions defining structure of a message sent or received as having a node format made up of six fields, "type of element", "tag attached to element", "constraints on element", "whether element is omissible", "pointer to subsequent node in the same nesting hierarchy" and "pointer to node in lower nesting hierarchy".

In another preferred construction, a message whose structure is defined by the abstract syntax notation one (ASN.1) is handled according to the packed encoding rules (PER).

According to the second aspect of the invention, a message processing method of sending and receiving a message composed of one or more elements between different kinds of devices and processing the message, comprising the steps of holding a parse tree generated from syntax descriptions defining structure of a message sent or received, as message data to be processed is applied, scanning the parse tree to encode and decode a value and outputting encoded and decoded values, processing a preamble field of a message for use in indicating whether an element exists or not in message data sent or received, and processing an index field of a message for use in indicating what number of element is selected in message data whose one of a plurality of elements is selected to be sent or received.

In the preferred construction, the message encoding step comprises the steps of when message data is applied, examining whether an element yet to be encoded exists in the message data or not, when there is no element yet to be encoded, outputting an encoding result of each element linked after a preamble as an encoding result, when an element yet to be encoded exists, scanning a subsequent node of the parse tree to examine whether the element in question is an omissible element or not, when the element in question is not an omissible element, examining whether the node in question is a node corresponding to the element yet to be encoded and when the node in question is not the corresponding node, again returning to the examination whether an element yet to be encoded exists or not, when the node is the corresponding node, encoding the element in question to again return to the examination whether an element yet to be encoded exists or not, when the element in question is an omissible element, generating a 1-bit field, linking the field to the trail of the existing preamble and examining whether the node in question is a node corresponding to the element yet to be encoded, and when the node is not the corresponding node, setting the contents of the generated field to the contents indicating that "omissible element is omitted" to again return to the examination whether an element yet to be encoded exists, and when the node in question is a node corresponding to the element yet to be encoded, setting the contents of the generated field to the contents indicating that "omissible element is not omitted" and encoding the element in question to again return to the examination whether an element yet to be encoded exists.

In another preferred construction, the message decoding step comprises the steps of when message data is applied, first reading and storing a preamble field, initializing a variable indicative of a bit position in the preamble field to 0, examining whether there exists an element yet to be decoded in the message data, when no element yet to be decoded exists, outputting a decoding result of each element, when an element yet to be decoded exists, scanning the subsequent node of the parse tree to examine whether an element corresponding to the node in question is an omissible element and when the element in question is not an omissible element, decoding the element in question to again return to the examination whether an element yet to be decoded exists, when the element in question is an omissible element, if the contents of the current bit position in the preamble field indicate that "omissible element is omitted", adding 1 to a variable indicative of the current bit position to return to the examination whether an element yet to be decoded exists, and if the contents of the current bit position in the preamble field indicate that "omissible element is not omitted", decoding the element in question and adding 1 to the variable indicative of the current bit position to return to the examination whether an element yet to be decoded exists.

In another preferred construction, in the preamble processing step, the parse tree is stored in a continues region on a storage region, and the message decoding step comprises the steps of when message data is applied, first reading and storing a preamble field, initializing a variable indicative of a bit position in the preamble field to 0, storing an address of a node being currently scanned in a variable indicative of an address of a node of the parse tree, examining whether there exists an element yet to be decoded in the message data, when no element yet to be decoded exists, outputting a decoding result of each element, when an element yet to be decoded exists, examining whether the element in question is an omissible element and when the element in question is not an omissible element, storing an address of a subsequent node in the variable indicative of an address of a node of the parse tree, scanning the node of the parse tree having the address in question and decoding the element in question to return to the examination whether an element yet to be decoded exists, when the element in question is an omissible element, if the contents of the current bit position in the preamble field indicate that "omissible element is omitted", storing an address of a subsequent node in the variable indicative of an address of a node of the parse tree and adding 1 to a variable indicative of the current bit position to return to the examination whether an element yet to be decoded exists, and if the contents of the current bit position in the preamble field indicate that "omissible element is not omitted", storing an address of a subsequent node in the variable indicative of an address of a node of the parse tree, scanning the node of the parse tree having the address in question, decoding the element in question and adding 1 to the variable indicative of the current bit position to return to the examination whether an element yet to be decoded exists.

In another preferred construction, the message encoding step comprises the steps of when message data is applied, examining whether a node of the parse tree being scanned is a node corresponding to a selected element and when the node is not the corresponding node, adding 1 to an index value being operated and scanning the subsequent node of the parse tree to again return to the examination whether the node being scanned corresponds to the selected element, and when the node is the corresponding node, encoding the index value being operated and encoding the element in question to output the encoding results of the index value and the element in question linked together.

In another preferred construction, the message decoding step comprises the steps of when message data is applied, first reading and storing an index field, decoding the contents of the index field to obtain an index value, initializing a variable indicative of a choice number to 0, scanning a subsequent node of the parse tree, examining whether the variable and the index value are equal and if the two values are not equal, adding 1 to the variable to again return to scanning of a subsequent node of the parse tree, and when the variable and the index value are equal, decoding the element in question.

In another preferred construction, in the preamble processing step, the parse tree is stored in a continuos region on a storage region, and the message decoding step comprises the steps of when message data is applied, first reading and storing an index field, decoding the contents of the index field to obtain an index value, storing an address of a node being currently scanned in a variable indicative of an address of a node of the parse tree, and scanning a node of the parse tree to be referred to by a sum of the variable and a product of the size of a storage region necessary for holding one node of the parse tree and the index value to decode the element in question.

According to another aspect of the invention, a computer readable memory storing a control program which controls a message processing device for sending and receiving a message composed of one or more elements between different kinds of devices, the control program comprising the steps of holding a parse tree generated from syntax descriptions defining structure of a message sent or received, as message data to be processed is applied, scanning the parse tree to encode and decode a value and outputting encoded and decoded values, processing a preamble field of a message for use in indicating whether an element exists or not in message data sent or received, and processing an index field of a message for use in indicating what number of element is selected in message data whose one of a plurality of elements is selected to be sent or received.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 3 is a block diagram showing structure of an index processing unit in the message processing device according to the present embodiment;

FIG. 4 is a diagram showing a format of a node of a parse tree for use in the message processing device of the present embodiment;

FIG. 14 is a diagram showing an example of encoding and decoding of a choice-type value by the message processing device of the present embodiment;

FIG. 15 is a diagram showing an example of ASN.1 abstract syntax for use in explaining an embodiment of the message processing device according to the present embodiment;

FIG. 16 is a diagram showing an example of a value notation of a message defined by the abstract syntax of FIG. 15;

FIG. 19 is a diagram showing, in the embodiment of the message processing device according to the present embodiment, an internal state and output of the message processing device at a time when Step 2 is completed in the encoding of the message of FIG. 16;

FIG. 20 is a diagram showing, in the embodiment of the message processing device according to the present embodiment, an internal state and output of the message processing device at a time when Step 3 is completed in the encoding of the message of FIG. 16;

FIG. 21 is a diagram showing, in the embodiment of the message processing device according to the present embodiment, an internal state and output of the message processing device at a time when Step 4 is completed in the encoding of the message of FIG. 16;

FIG. 22 is a diagram showing, in the embodiment of the message processing device according to the present embodiment, an internal state and output of the message processing device at a time when Step 5 is completed in the encoding of the message of FIG. 16;

FIG. 23 is a diagram showing, in the embodiment of the message processing device according to the present embodiment, an internal state and output of the message processing device at a time when Step 6 is completed in the encoding of the message of FIG. 16;

FIG. 24 is a diagram showing, in the embodiment of the message processing device according to the present embodiment, an internal state and output of the message processing device at a time when Step 7 is completed in the encoding of the message of FIG. 16;

FIG. 28 is a diagram showing encoding results obtained when the message of FIG. 16 is encoded in the embodiment of the message processing device according to the present embodiment;

FIG. 29 is a diagram showing a form in which a parse tree is held at a parse tree holding unit in a second embodiment of the message processing device according to the present embodiment;

FIG. 33 is a diagram showing an example of ASN.1 abstract syntax for use in explaining the conventional message processing device;

FIG. 37 is a diagram showing encoding results obtained by the encoding of the message of FIG. 34 by the conventional message processing device;

FIG. 38 is a diagram showing an example of decoding results obtained by a conventional message processing device.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
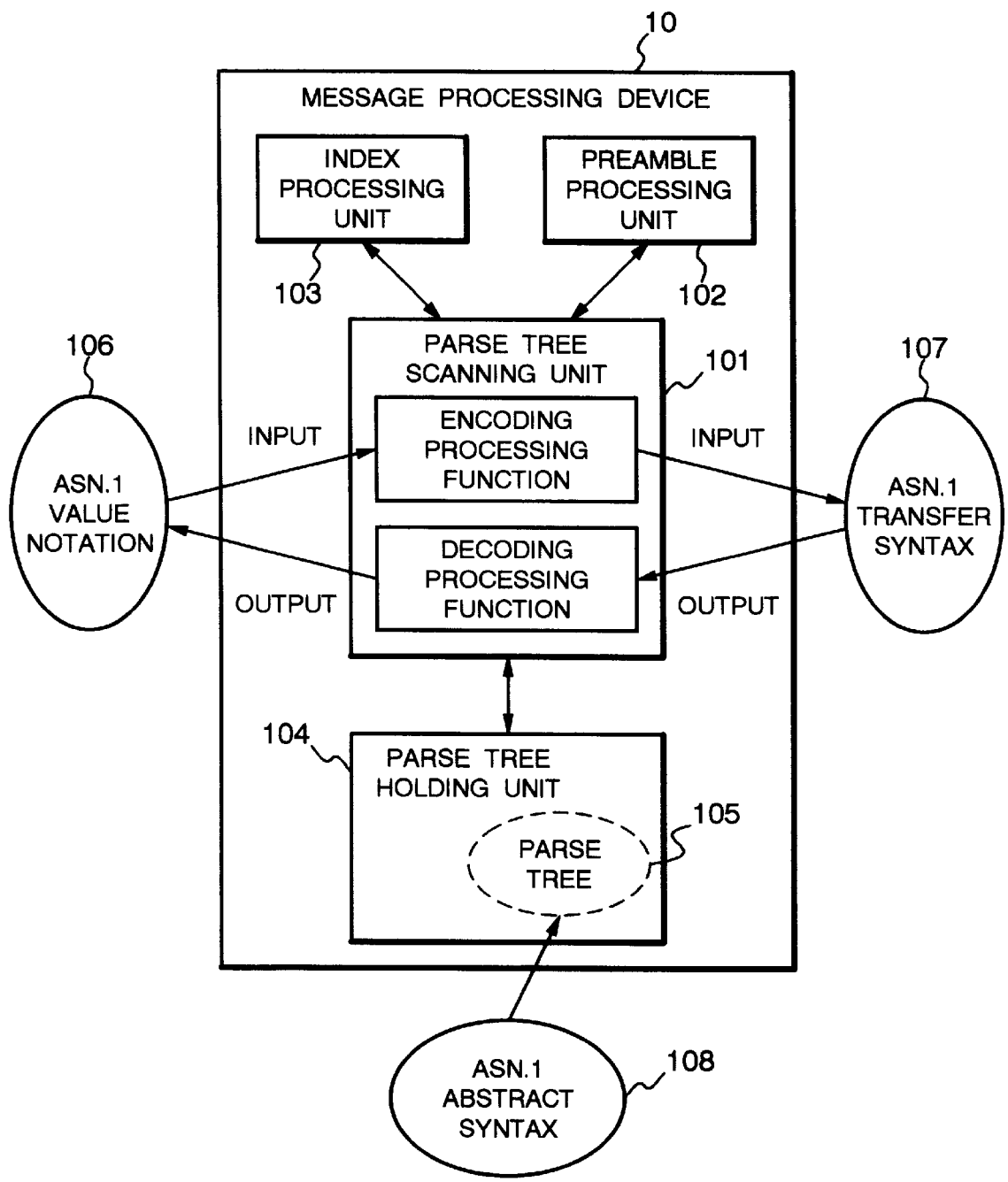
FIG. 1 is a block diagram showing structure of a message processing device as one form of an embodiment of the present invention.

FIG. 1 is a block diagram schematically showing structure of a message processing device according to an embodiment of the present invention. As illustrated in FIG. 1, a message processing device 10 of the present embodiment includes a parse tree holding unit 104, a parse tree scanning unit 101, a preamble processing unit 102 and an index processing unit 103. In FIG. 1, illustration is made only of a characteristic part of the structure of the present embodiment and that of the remaining common part is omitted.

Each component of the message processing device according to the present embodiment is realized by a program-controlled device in a computer system such as a workstation or a personal computer. A computer program which controls the processing device is provided as storage in a storage medium such as a magnetic disk or a semiconductor memory and is loaded into the processing device to execute functions as will be described in the following.

The parse tree holding unit 104 has a function of holding a parse tree 105 generated from an ASN.1 abstract syntax 108. The parse tree scanning unit 101 has a function of, upon application of an ASN.1 value notation 106 (message to be processed), sending and receiving instructions to and from the preamble processing unit 102 and the index processing unit 103 to scan the parse tree 105 and encoding a value to generate an ASN.1 transfer syntax 107 (encoding result), as well as a function of, upon application of the ASN.1 transfer syntax 107 (message to be processed), sending and receiving instructions to and from the preamble processing unit 102 and the index processing unit 103 to scan the parse tree 105 and decoding a value to generate the ASN.1 value notation 106 (decoding result).

The preamble processing unit 102, at the encoding of a value, when a sequence-type or set-type element is designated as optional or default, generates a bit field called preamble and sets each bit in the preamble at a predetermined value ('1' when an element exists and '0' when no element exists) based on an instruction from the parse tree scanning unit 101. The preamble processing unit 102 also has a function of, at the decoding of a value, analyzing an input preamble to instruct the parse tree scanning unit 101 on a node of the parse tree 105 to be scanned next.

The index processing unit 103 has a function of, at the encoding of a value, counting an index value based on an instruction from the parse tree scanning unit 101 to generate an index field when handling a choice-type element. The index processing unit 102 also has a function of, at the decoding of a value, analyzing an input index field to instruct the parse tree scanning unit 101 on a node of the parse tree 105 to be scanned next.

Figure 2:
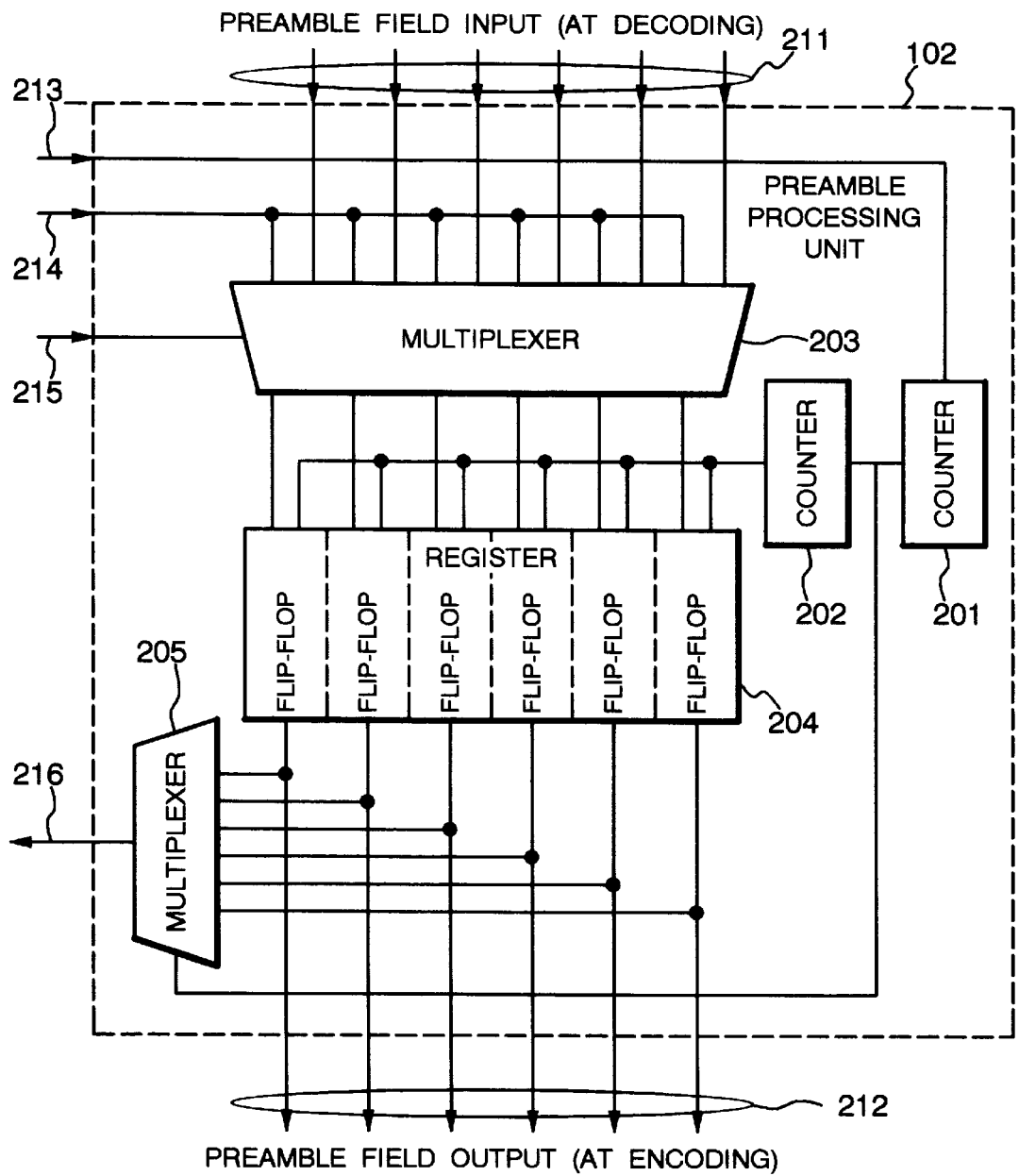
FIG. 2 is a block diagram showing structure of a preamble processing unit in the message processing device according to the present embodiment.

Description will be next made of structure of the preamble processing unit 102 of the message processing device according to the present embodiment. FIG. 2 is a block diagram schematically showing structure of the preamble processing unit 102 at the message processing device 10 of the present embodiment. As illustrated in FIG. 2, the preamble processing unit 102 of the present embodiment includes a counter 201, a decoder 202, a first multiplexer 203, a register 204 and a second multiplexer 205.

Input/output signals related to the preamble processing unit 102 are a preamble field input signal 211 for the decoding of a message, a preamble field output signal 212 for the encoding of a message, a signal 213 applied from the parse tree scanning unit and indicating whether a node being scanned is designated as optional or default, a signal 214 applied from the parse tree scanning unit and indicating whether an element corresponding to a node being scanned exists, a signal 215 applied from the parse tree and indicating which processing of encoding and decoding is currently being executed, and a signal 216 which is to be output to the parse tree scanning unit and gives an instruction to scan the next node and decode an element corresponding to the node.

The counter 301 has a function of receiving input of the signal 213 indicating whether a node being scanned is designated as optional or as default and when the signal 213 indicates that the node is designated as such, counting up a count value and outputting the count value to the decoder 202. The decoder 202 has a function of receiving and decoding said count value and outputting the decoded value as a write enable signal to each of the flip-flops constituting the register 204.

The first multiplexer 203 has a function of receiving input of the signal 215 indicating which processing of encoding and decoding is being currently executed and when the signal 215 indicates encoding, outputting the signal 214 to the register 204 and when the signal 215 indicates decoding, outputting the signal 211 to the register 204. The register 204 has a function of receiving input of the signal from the first multiplexer 203 and a write enable signal from the decoder 202, and for a flip-flop to which said write enable signal is effective, reading the signal from the first multiplexer 203 and holding the contents and for a flip-flop to which said write enable signal is not effective, keeping holding the currently held contents and further outputting the currently held contents as the signal 212 and outputting the same to the second multiplexer 205.

The second multiplexer 205 has a function of receiving input of the preamble field output signal 212 from the register 204 and a count value from the counter 202 to output, to the parse tree scanning unit, the contents of a bit at a bit position corresponding to the count value in the preamble field as the instruction signal 216 which gives an instruction to decode an element corresponding to the subsequent node.

Description will be next made of structure of the index processing unit 103 of the message processing device according to the present embodiment. FIG. 3 is a block diagram schematically showing structure of the index processing unit 103 in the message processing device 10 of the present embodiment. As illustrated in FIG. 3, the index processing unit 103 of the present embodiment includes a counter 301, a first register 302, a second register 303 and a comparator 304.

Input/output signals related to the index processing unit 103 are an index field input signal 311 for the decoding of a message, an index value output signal 312 for the decoding of a message, an index field output signal 313 for the encoding of a message, a signal 314 applied from the parse tree scanning unit and indicating whether a subtree with a choice-type node as a root node is currently being scanned or not, a signal 315 applied from the parse tree scanning unit and indicating whether a node corresponding to a selected choice-type element is being scanned or not, and a signal 316 which is to be output to the parse tree scanning unit and gives an instruction to decode a value of an element corresponding to a node of the parse tree corresponding to an index value being currently output.

The counter 201 has a function of receiving input of the signal 314 indicating whether a subtree with a choice-type node as a root node is being scanned and when the signal 314 indicates that the subtree in question is being scanned, counting up a count value, outputting the count value to the first register 302 and the comparator 304 and outputting the count value as the index value output signal 312.

The first register 302 has a function of receiving input of said count value and the signal 315 indicating whether a node corresponding to a selected choice-type element is being scanned or not and when the signal 315 indicates that the node in question is being scanned, outputting the currently held contents as the index field output signal 313 and when the signal 315 indicates that the node in question is not being scanned, holding said count value.

The second register 303 has a function of receiving input of the index field signal 311 and holding the signal 311, as well as outputting the currently held contents to the comparator 314. The comparator 314 has a function of receiving input of said count value and a signal from the second register 303 and comparing the contents of the two, and when the contents coincide with each other, outputting the signal 316 which gives instruction to decode a value of an element corresponding to a node of the parse tree corresponding to the currently output index value.

Next, description will be made of the parse tree 105 held by the parse tree holding unit 104 of the message processing device 10 according to the present embodiment. The parse tree 105 can be generated from the ASN.1 abstract syntax 108 using an ASN.1 compiler or other technique. FIG. 4 is a diagram showing a format of a node of the parse tree 105. As illustrated in FIG. 4, one node of the parse tree 105 is composed of six fields.

Figure 5:
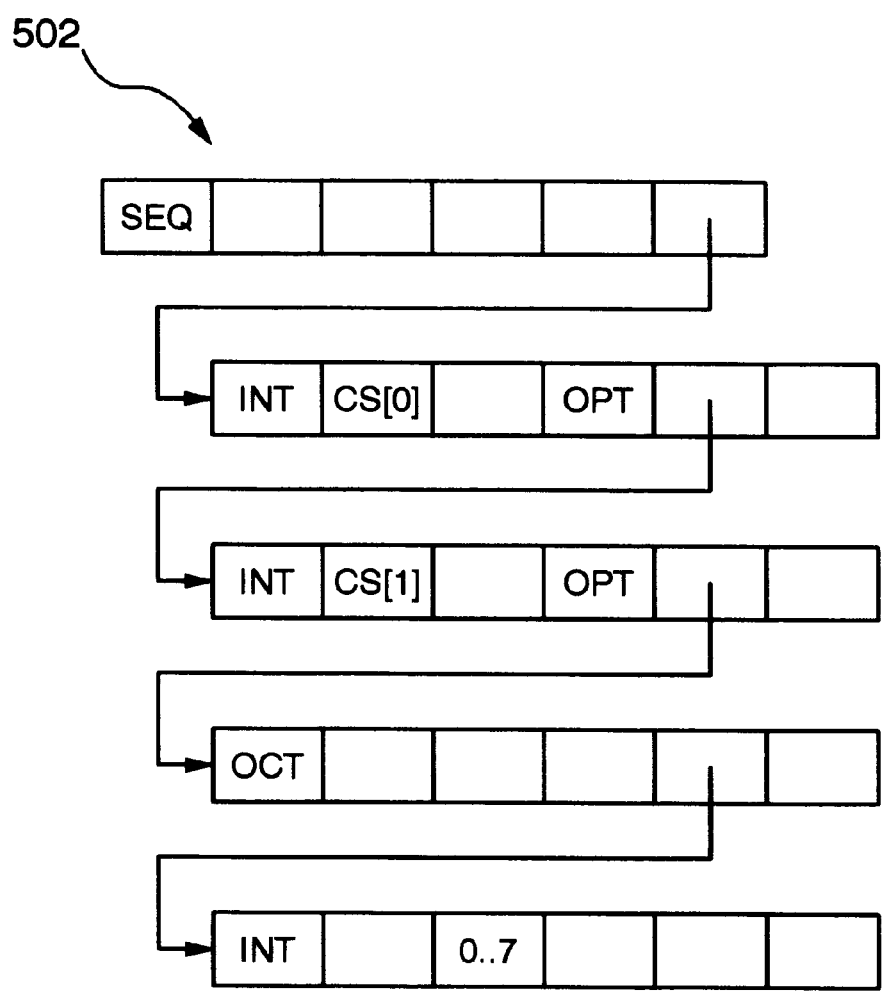
FIG. 5 is a diagram showing examples of ASN.1 abstract syntax and a parse tree corresponding thereto.

A first field 401 is a field indicative of a type of element of the ASN.1 abstract syntax 108 corresponding to a node. A second field 402 is a field indicative of a tag (application tag, context-specific tag, etc.) attached to the element of the ASN.1 abstract syntax 108 corresponding to the node. A third field 403 is a field indicative of constraints (range of obtainable values and range of lengths of values) imposed on the element of the ASN.1 abstract syntax 108 corresponding to the node. A fourth field 404 is a field indicating whether the element of the ASN.1 abstract syntax 108 corresponding to the node is designated as optional or default. A fifth field 405 is a field which stores, with respect to the element in the ASN.1 abstract syntax 108 corresponding to the node, a pointer to a node corresponding to an element existing in the same nesting hierarchy as and subsequent to the former element. A sixth field 406 stores, with respect to the element in the ASN.1 abstract syntax 108 corresponding to the node, a pointer to a node corresponding to an element existing in the nesting hierarchy lower by one than the former element. For example, a parse tree corresponding to the ASN.1 abstract syntax 501 of FIG. 5 is that denoted by 502 in FIG. 5.

(Description of Operation)

Next, how the message processing device 10 operates in the present embodiment will be described. Description will be made with respect to three cases, a case of handling the sequence type or the set type (where the parse tree scanning unit 101 sends and receives instructions to and from the preamble processing unit 102 to operate), a case of handling the choice type (where the parse tree scanning unit 101 sends and receives instructions to and from the index processing unit 103 to operate) and a case of handling the other types than these (where the parse tree scanning unit 101 operates without sending and receiving instructions to and from either of the preamble processing unit 102 and the index processing unit 103).

Case 1 (where other types than the sequence type, the set type and the choice type are handled)

In encoding, as the ASN.1 value notation 106 (input data to be encoded) is applied, the parse tree scanning unit 101 scans the parse tree 105 held by the parse tree holding unit 104 to conduct encoding according to a type of element in question indicated in the first field of a node of the parse tree 105. At the encoding, data length of an encoding result is compressed using constraints on the element of the type in question which is indicated in the third field of the node of the parse tree.

In decoding, as the ASN.1 transfer syntax 107 (input data to be decoded) is applied, the parse tree scanning unit 101 scans the parse tree 105 held by the parse tree holding unit 104 to conduct decoding according to a type of element in question indicated in the first field of a node of the parse tree 105. At the decoding, determination is made in which compression format the data to be decoded is compressed by making use of the constraints on the element of the type in question which is indicated in the third field of the node of the parse tree to decode the data as a value of the element in question.

Figure 6:
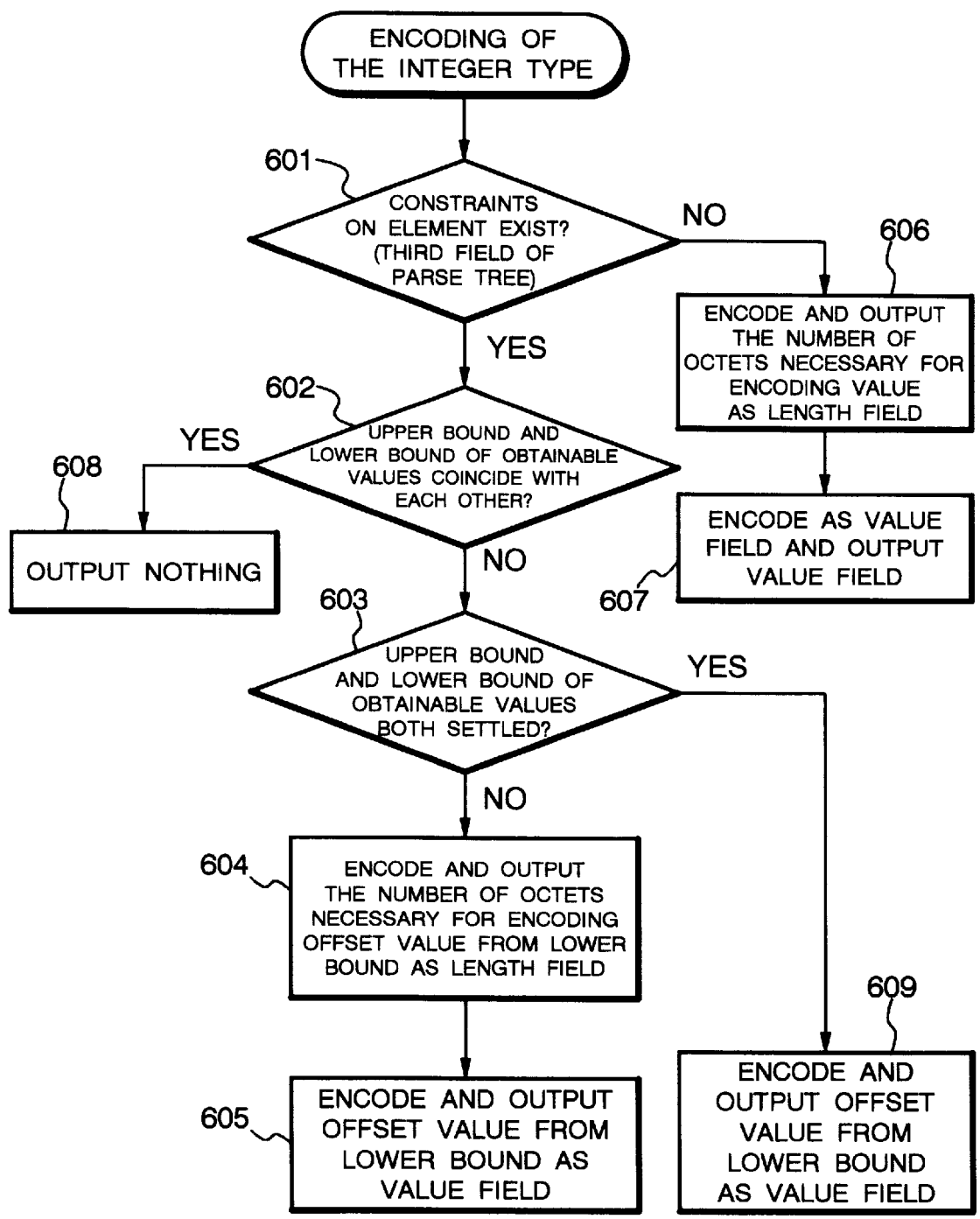
FIG. 6 is a flow chart showing a flow of processing to be conducted for encoding an integer-type value in the message processing device of the present embodiment.

As an example of Case 1, a flow chart of the processing for encoding an integer-type element is shown in FIG. 6. In the encoding of an integer-type value, the parse tree scanning unit 101 scans a node in question of the parse tree 105 to examine the third field (Step 601). When there is no constraint, encode the number of octets necessary for encoding the value as a length field and encode the value itself as a value field to finish the processing (Steps 606 and 607). With constraints, examination is made whether an upper bound and a lower bound of obtainable values coincide with each other or not (Step 602). When they coincide with each other, output nothing to finish the processing (Step 608). When they fail to coincide with each other, examination is made whether the upper bound and the lower bound of obtainable values are both settled (Step 603). When they are settled, encode an offset value from the lower bound of obtainable values as a value field to finish the processing (Step 609). Whey they are not settled, encode the number of octets necessary for encoding the offset value from the lower bound of obtainable values as a length field and encode the offset value as a value field to finish the processing (Steps 604 and 605).

Figure 7:
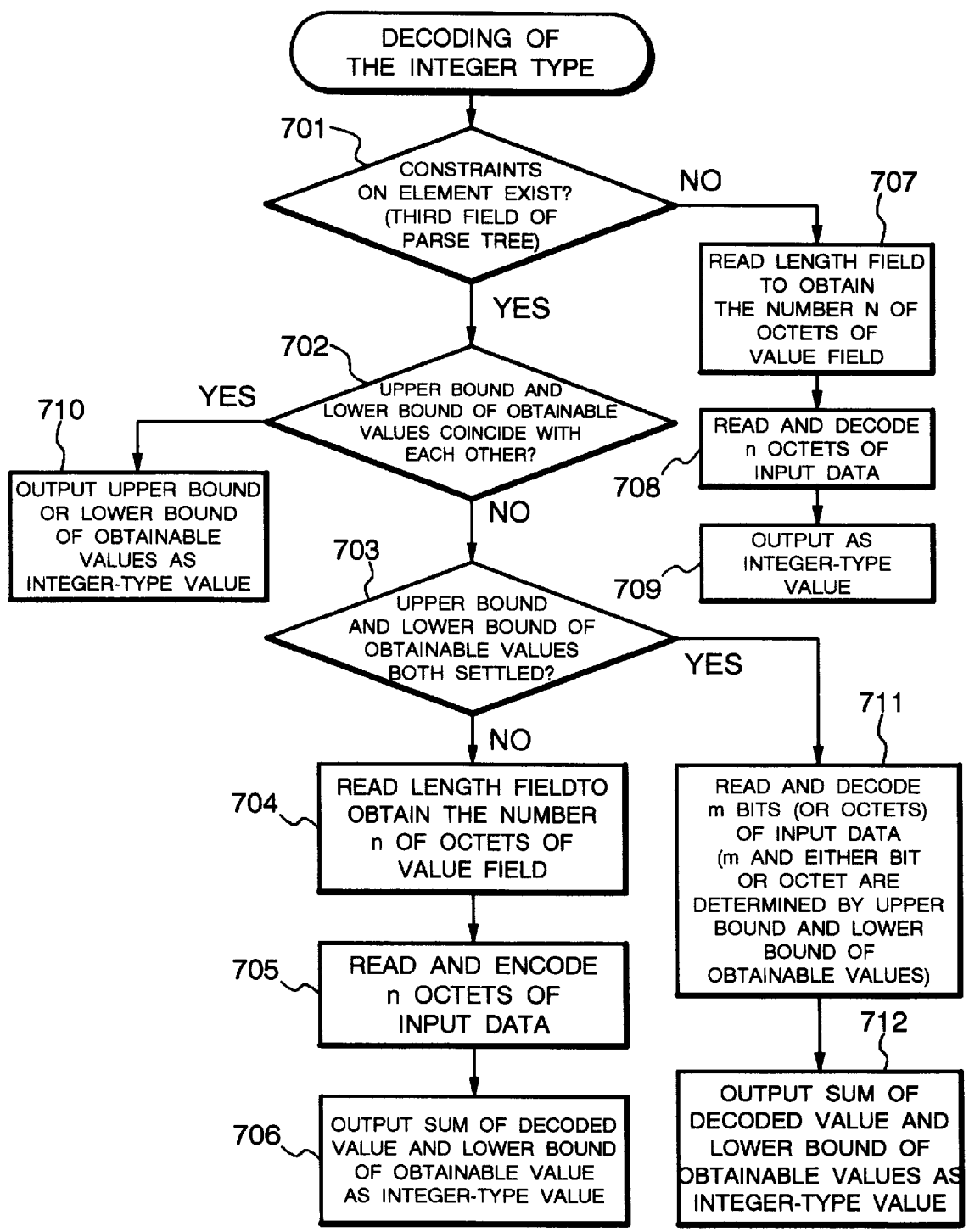
FIG. 7 is a flow chart showing a flow of processing to be conducted for decoding an integer-type value in the message processing device of the present embodiment.

Next, a flow chart of the processing for decoding an integer-type element is shown in FIG. 7. In the decoding of an integer-type value, the parse tree scanning unit 101 scans a node in question of the parse tree 105 to examine the third field (Step 701).

When there is no constraint, read a length field to obtain the number n of octets of a value field (Step 707). Next, read n octets of the input data and decode the same to output as an integer-type value (Steps 708 and 709). With constraints, examine whether an upper bound and a lower bound of obtainable values coincide with each other (Step 702). When they coincide with each other, output a value of the upper bound (which is also the lower bound) of obtainable values as an integer-type value (Step 710). When they fail to coincide with each other, examine whether the upper bound and the lower bound of obtainable values are both settled or not (Step 703). When they are settled, read m bits or m octets of the input and decode the same. (The value of m and either bit or octet are here determined by upper and lower bounds of obtainable values. For, example, if the lower bound is 0 and the upper bound is 15, m will be four bits, and if the lower bound is 0 and the upper bound is 255, m will be one octet.) (Step 711).

Next, output a sum of the decoded value and the lower bound of obtainable values as an integer-type value (Step 712). When they are not settled, read the length field to obtain the number n of octets of the value field (Step 704). Next, read n octets of the input data and decode the same (Step 705). Next, output a sum of the decoded value and the lower bound of obtainable values as an integer-type value (Step 706).

Figure 8:
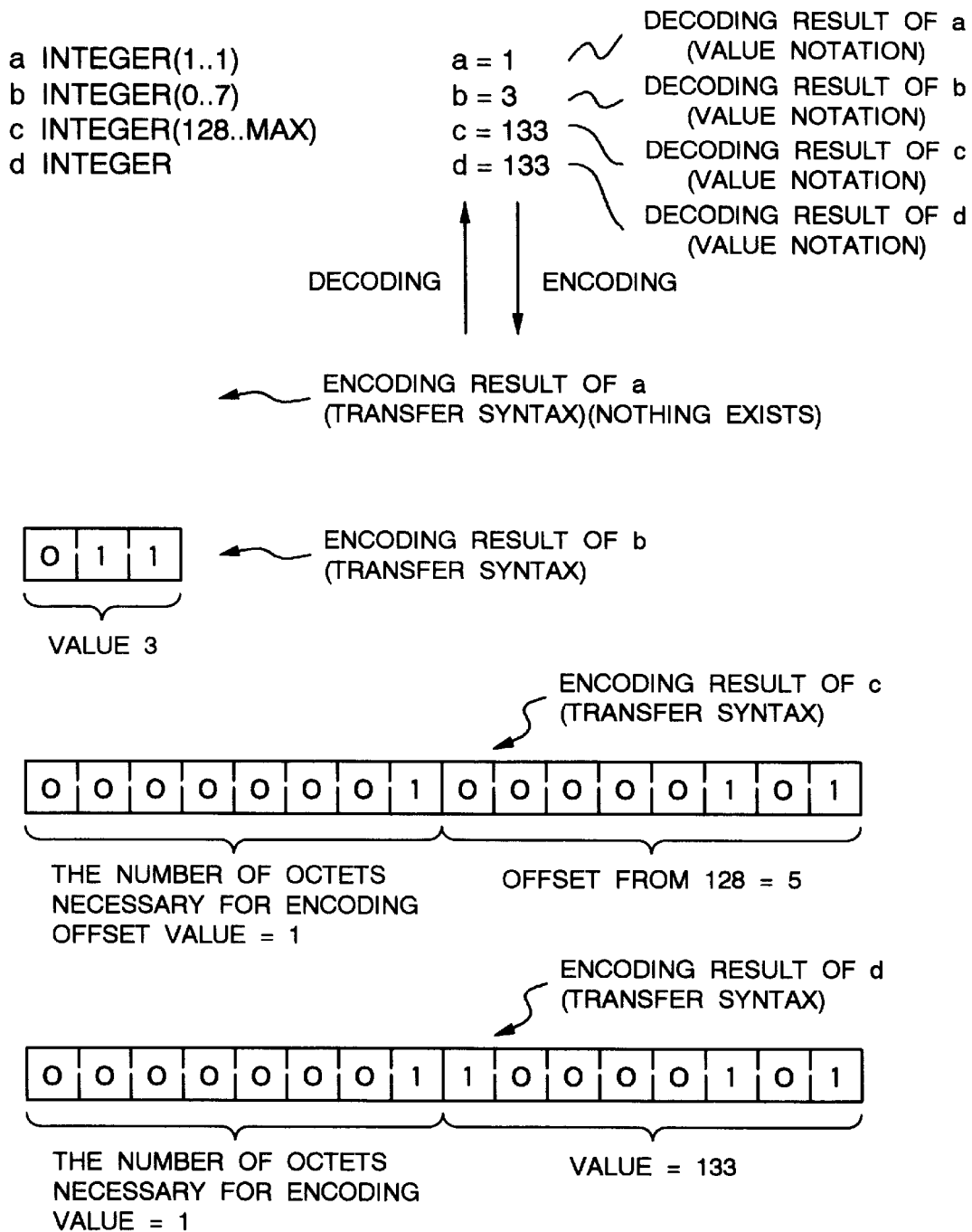
FIG. 8 is a diagram showing an example of encoding and decoding of a value of the integer type in the message processing device of the present embodiment.

An example of actual encoding and decoding of an integer-type element is shown in FIG. 8.

Case 2 (where the sequence type or the set type are handled)

Figure 9:
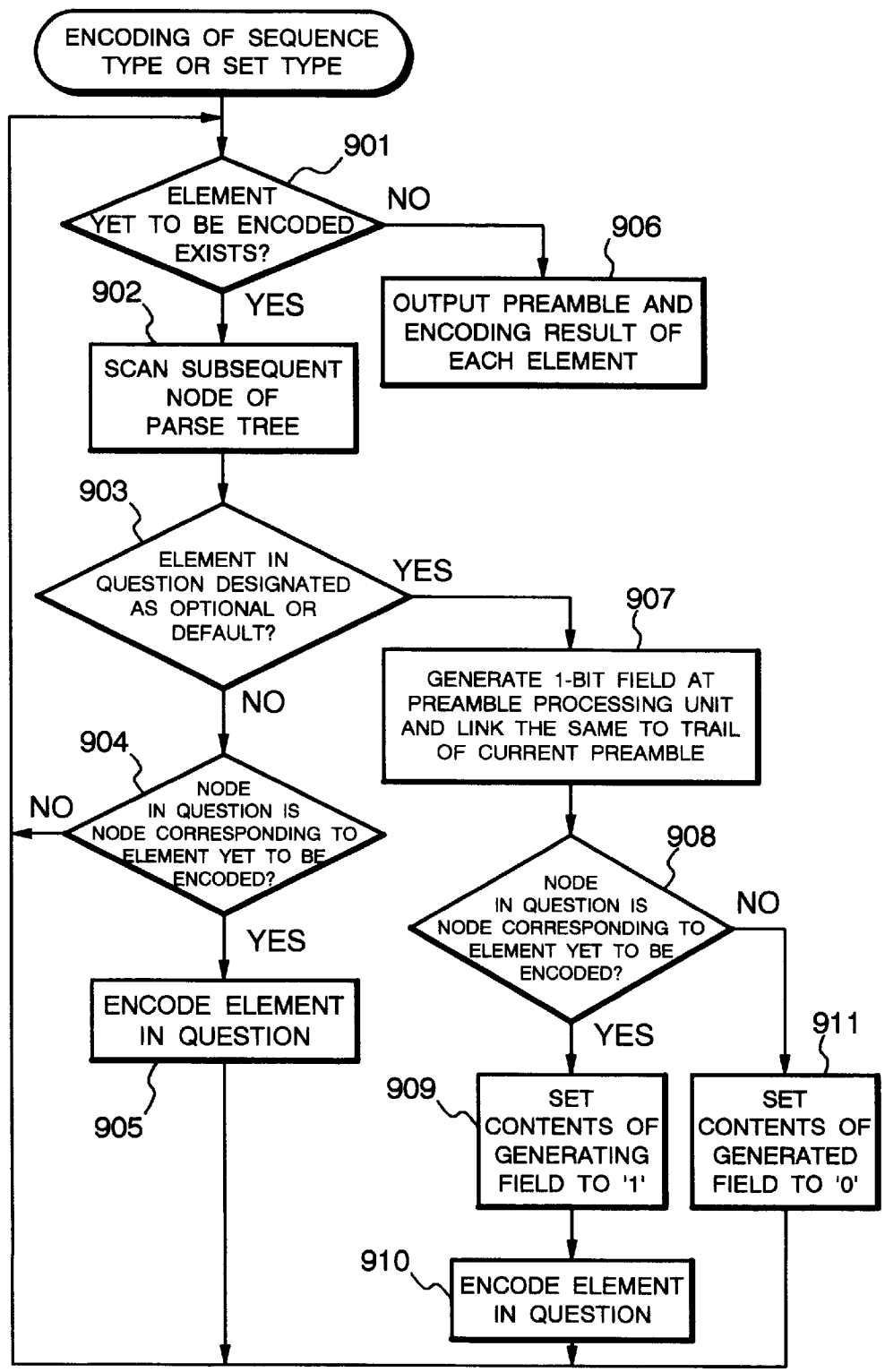
FIG. 9 is a flow chart showing a flow of processing to be conducted for encoding a value of a sequence type or a set type value in the message processing device of the present embodiment.

Flow chart of the processing for encoding is shown in FIG. 9. Upon application of the ASN.1 value notation 106 input data to be encoded), examine whether there is an element yet to be encoded (Step 901). If there is no element yet to be encoded, output an encoding result of each element linked after a preamble as a sequence-type or set-type encoding result (Step 906). If there is an element yet to be encoded, the parse tree scanning unit 101 scans the subsequent node of the parse tree 105 (Step 902). Next, the parse tree scanning unit 101 examines whether the element in question is designated as optional or default (Step 903).

If the element is designated neither as optional nor default, the parse tree scanning unit 101 examines whether the node in question is a node corresponding to the element yet to be encoded (Step 904). If it is not the corresponding node, return to Step 901.

If it is the corresponding node, encode the element in question (Step 905) to return to Step 901. When the element in question is designated as optional or default at Step 903, the parse tree scanning unit 101 gives an instruction to the preamble processing unit 102, whereby the preamble processing unit 102 generates a 1-bit field and links the same at the trail of the existing preamble (Step 907).

Next, the parse tree scanning unit 101 examines whether the node in question is a node corresponding to the element yet to be encoded (Step 908). If the node is not the corresponding node, the parse tree scanning unit 101 gives an instruction to the preamble processing unit 102, whereby the preamble processing unit 102 sets the contents of the generated field to '0' (Step 911) to return to Step 901. If it is the corresponding node, the parse tree scanning unit 101 gives an instruction to the preamble processing unit 102, whereby the preamble processing unit 102 sets the contents of the generated field to '1' (Step 909) and the parse tree scanning unit 101 encodes the element in question (Step 910) to return to Step 901.

Figure 10:
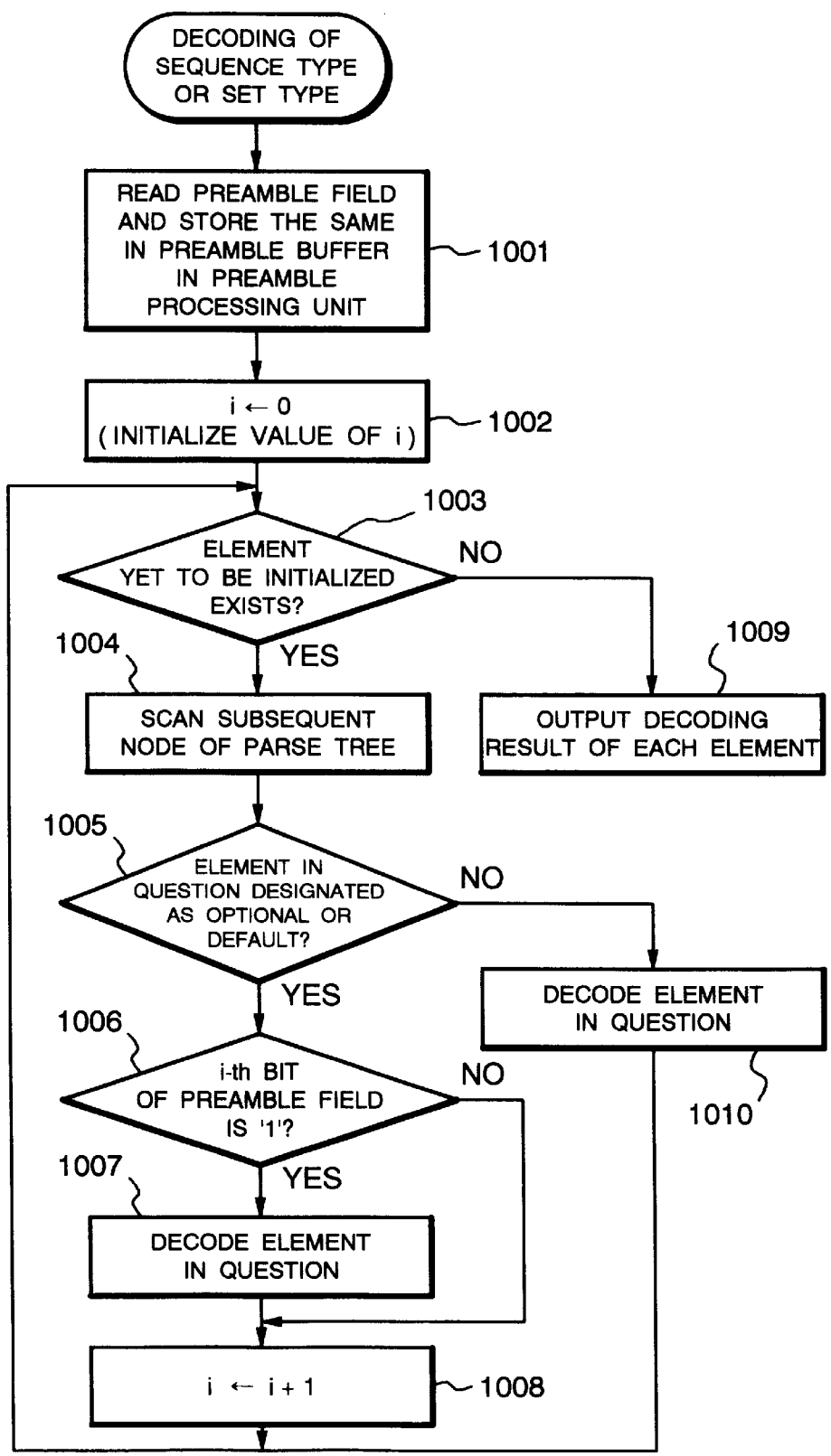
FIG. 10 is a flow chart showing a flow of processing to be conducted for decoding a value of a sequence-type or set-type value in the message processing device of the present embodiment.

Flow chart of the processing for decoding is shown in FIG. 10. Upon application of the ASN.1 transfer syntax 107 (input data to be decoded), first read a preamble field and store the same in a preamble buffer in the preamble processing unit 102 (Step 1001). Next, initialize a variable i indicative of a bit position within the preamble field to 0 (Step 1002).

Next, examine whether there is an element yet to be decoded (Step 1003). If there is no element yet to be decoded, output a decoding result of each element (Step 1009). If there is an element yet to be decoded, the parse tree scanning unit 101 scans the subsequent node of the parse tree 105 (Step 1004). Then, the parse tree scanning unit 101 checks the fourth field of the node of the parse tree 105 to examine whether an element corresponding to the node in question is designated as optional or default (Step 1005). If it is designated neither as optional nor default, the parse tree scanning unit 101 decodes the element in question (Step 1010) to return to Step 1003. If it is designated as optional or default, the preamble processing unit 102 examines whether i-th bit of the preamble field is '1' (Step 1006). If it is not '1', add 1 to the value of i (Step 1008) to return to Step 1003. If it is '1', the preamble processing unit 102 gives an instruction to the parse tree scanning unit 101, whereby the parse tree scanning unit 101 decodes the element in question (Step 1007). Thereafter, add 1 to the value of i (Step 1008) to return to Step 1003.

Figure 11:
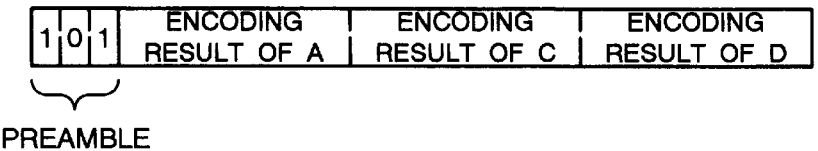
FIG. 11 is a diagram showing an example of encoding and decoding of a sequence-type value by the message processing device of the present embodiment.

An example of actual encoding and decoding of a sequence-type element is shown in FIG. 11.

Figure 12:
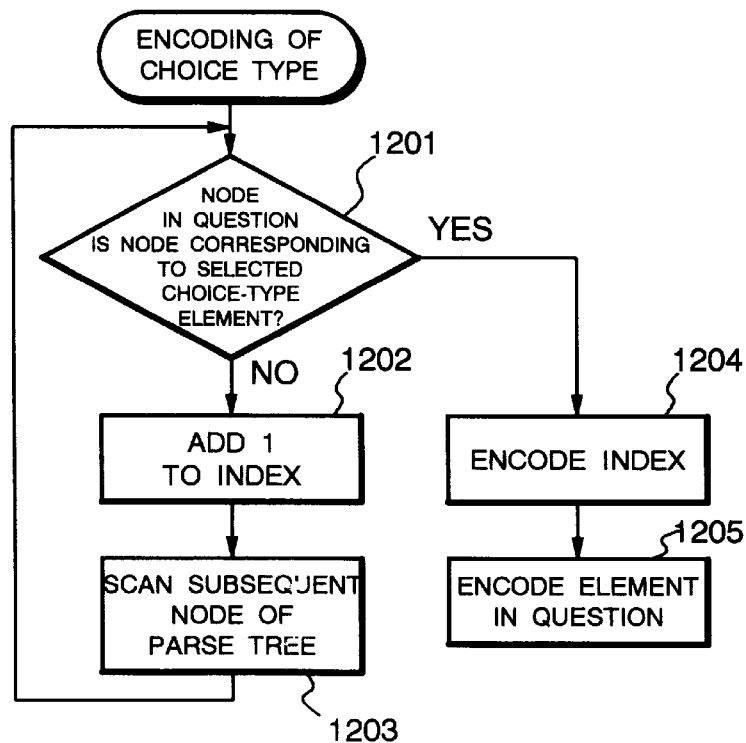
FIG. 12 is a flow chart showing a flow of processing to be conducted for encoding a value of a choice type in the message processing device of the present embodiment.

Case 3 (where the choice type is handled) Flow chart of the processing for encoding is shown in FIG. 12. Upon application of the ASN.1 value notation 106 (input data to be encoded), the parse tree scanning unit 101 examines whether a node in question is a node corresponding to the input element (Step 1201). If it is not the corresponding node, the parse tree scanning unit 101 gives an instruction to the index processing unit 103, whereby the index processing unit 103 adds 1 to an index value (Step 1202).

Next, the parse tree scanning unit 101 scans the subsequent node of the parse tree 105 (Step 1203). When the node is the corresponding node at Step 1201, the parse tree processing unit 101 gives an instruction to the index processing unit 103, whereby the index processing unit 103 encodes the current index value (Step 1204). Next, the parse tree scanning unit 101 encodes the element in question and links the encoding result of the index value and the encoding result of the element in question together to output the obtained value as a choice-type encoding result (Step 1205).

Figure 13:
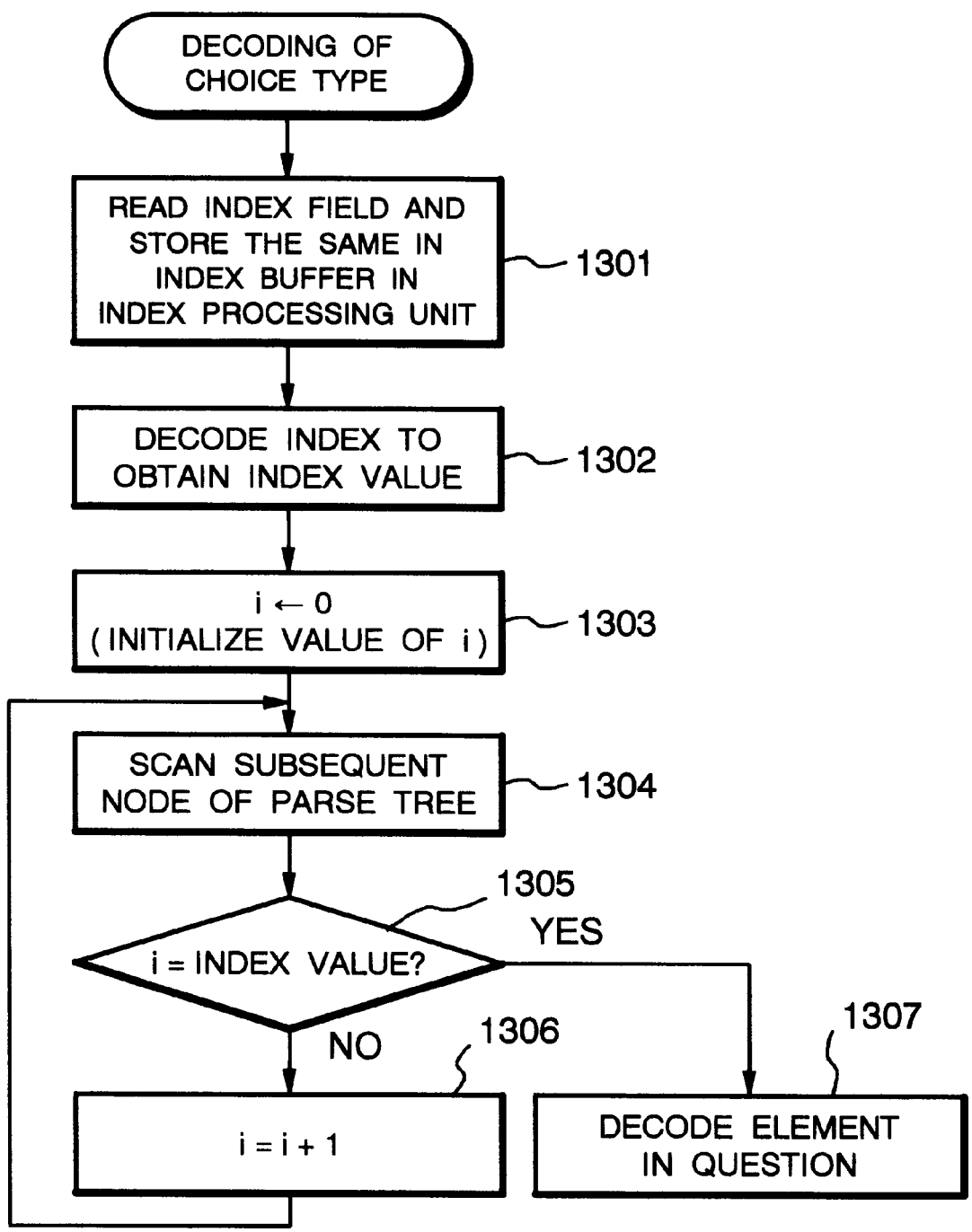
FIG. 13 is a flow chart showing a flow of processing to be conducted for decoding a value of a choice type in the message processing device of the present embodiment.

Flow chart of the processing for decoding is shown in FIG. 13. Upon application of the ASN.1 transfer syntax 107 (input data to be decoded), first read an index field and store the index field in the index buffer in the index processing unit 103 (Step 1301). Next, decode an index from the read index field to obtain an index value (Step 1302). Next, initialize the variable i temporarily indicating an index value (Step 1303).

Next, the parse tree scanning unit 101 scans the subsequent node of the parse tree 105 (Step 1304). The index processing unit 103 examines whether i and the index value are equal (Step 1305). If they are not equal, add 1 to the value of i (Step 1306) to return to Step 1304. If they are equal, the index processing unit 103 gives an instruction to the parse tree scanning unit 101, whereby the parse tree scanning unit 101 decodes the element in question (Step 1307).

An example of actual encoding and decoding of a choice-type element is shown in FIG. 14.

For specifically describing how a message is encoded and decoded by the message processing device 10 of the present embodiment, consideration will be given to a case of the encoding of a message represented by the ASN.1 value notation of FIG. 16 whose structure is defined by the ASN.1 abstract syntax of FIG. 15. This case is premised on that encoding is conformed to PER standardized by ISO as encoding rules.

Figure 17:
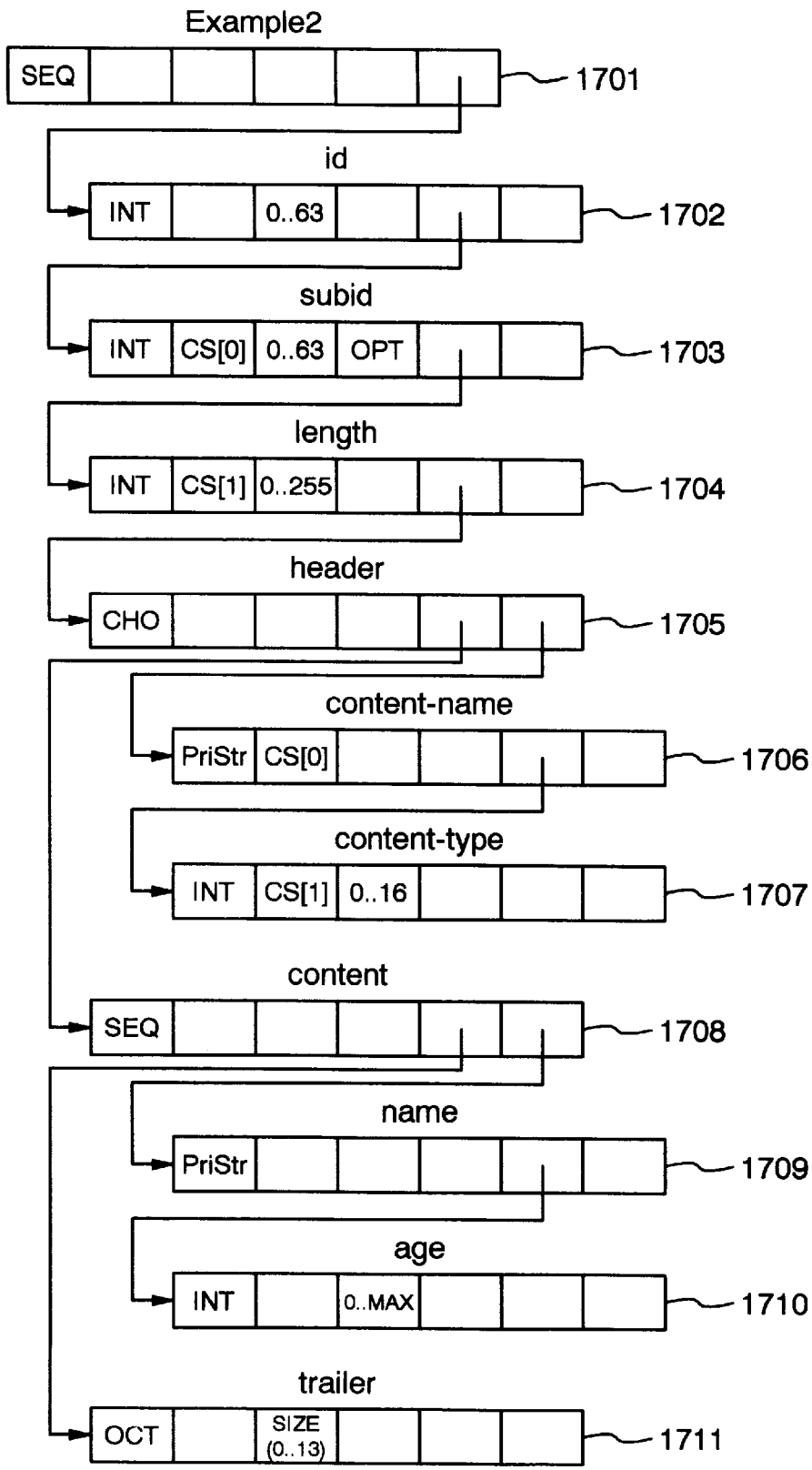
FIG. 17 is a diagram showing a parse tree generated based on the abstract syntax of FIG. 15.

The ASN.1 abstract syntax of FIG. 15 defines structure of a message "Example 2" and indicates that the message Example 2 is of the sequence type and has a sequence of six elements, "id", "subid", "length", "header", "content" and "trailer". In addition, "id", "subid" and "length" are of the integer type, "header" is of the choice type, "content" is of the sequence type and "trailer" is of the octet string type. FIG. 17 shows a parse tree generated from the ASN.1 abstract syntax of FIG. 15. In the following, description will be made for each step.

Step 1 (at a time point of reception of a message up to 1601)

Figures 18, 31:
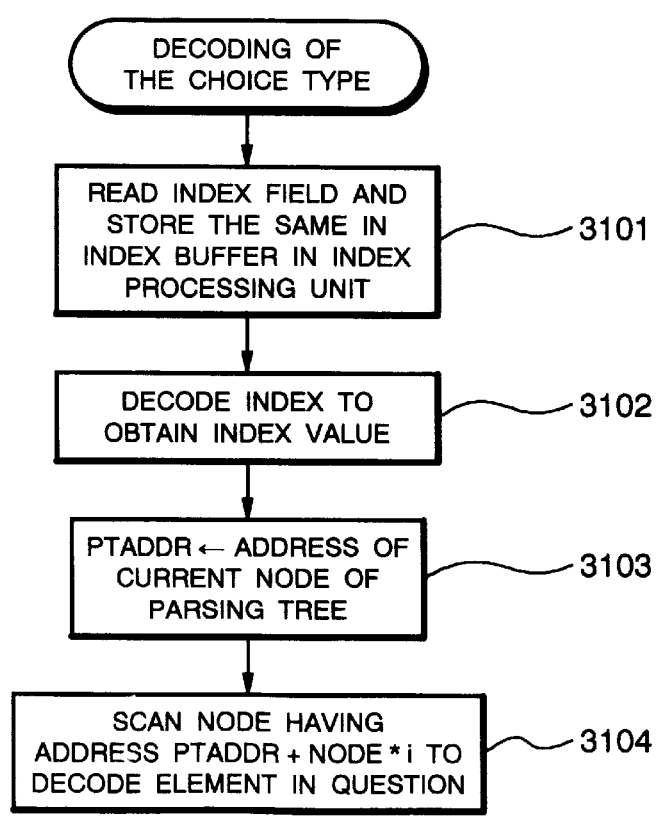
FIG. 18 is a diagram showing, in the embodiment of the message processing device according to the present embodiment, an internal state and output of the message processing device at a time when Step 1 is completed in the encoding of the message of FIG. 16.
FIG. 31 is a flow chart showing a flow of processing to be conducted for decoding the choice type in the second embodiment of the message processing device according to the present embodiment.

The parse tree scanning unit 101 scans a node 1701 of the parse tree to sense that the input message Example 2 is of the sequence type. Nothing is yet to be generated as output data. FIG. 18 shows an internal state and output of the message processing device 10 at a tome point when Step 1 is completed.

Step 2 (at a time point of reception of a message up to 1602)

The parse tree scanning unit 101 scans a node 1702 of the parse tree to sense that the input element "id" is of the integer type and that an obtainable value is limited to be not less than 0 and not more than 1023. Since the range of obtainable values is 1024, the value 3 of "id" is encoded as two-octet field '0003' (hexadecimal) and stored in an output buffer at the number 0 in the parse tree scanning unit 101. Nothing is yet to be generated as output data. FIG. 19 shows an internal state and output of the message processing device 10 at a time point when Step 2 is completed.

Step 3 (at a time point of reception of a message up to 1603)

The parse tree scanning unit 101 scans a node 1703 of the parse tree to sense that "subid" is of the integer type, that an obtainable value is limited to be not less than 0 and not more than 1023 and that "subid" is designated as optional. Here, the parse tree scanning unit 101 gives an instruction to the preamble processing unit 102, whereby the preamble processing unit 102 generates a 1-bit bit field in a preamble buffer at the number 0 in the preamble processing unit 102.

Here, since the input element is "length" (not "subid"), the parse tree scanning unit 101 gives an instruction to the preamble processing unit 102, whereby the preamble processing unit 102 sets the contents of the generated bit field to '0'. Next, the parse tree scanning unit 101 scans a node 1704 of the parse tree to sense that the input element "length" is of the integer type and that an obtainable value is limited to be not less than 0 and not more than 255. Since the range of obtainable values is 256, the value 4 of "length" is encoded as 1-octet field '04' (hexadecimal) and is linked to the field stored in the output buffer at the number 0 in the parse tree scanning unit 101. Nothing is yet to be generated as output data. FIG. 20 shows an internal state and output of the message processing device 10 at a time point when Step 3 is completed (in FIG. 20, linked fields are illustrated as being connected with a dotted line for the convenience of space on paper).

Step 4 (at a time point of reception of a message up to 1604)

The parse tree scanning unit 101 scans a node 1705 of the parse tree to sense that a value to be encoded next is of the choice type. Next, the parse tree scanning unit 101 scans a node 1706 of the parse tree to sense that "content-name" is of the printable string type. Since the input element is not content-name, the parse tree scanning unit 101 gives an instruction to the index processing unit 103, whereby the index processing unit 103 adds 1 to the contents of the index buffer at the number 0 to have the value 1.

Next, the parse tree scanning unit 101 scans a node 1707 of the parse tree to sense that the input element "content-type" is of the integer type and that an obtainable value is limited to be not less than 0 and not more than 15. Since the range of obtainable values is 16, the value 4 of the "content-type" is encoded as a 4-bit field '0100' (binary). In addition, the parse tree scanning unit 101 gives an instruction to the index processing unit 103 to encode the current index value, whereby the index processing unit 103 encodes the current index value 1 as 1-bit field '1' (binary). A field '10100' (binary) obtained by the encoding result of the index and the encoding result of the value linked together is generated and linked to the field stored in the output buffer of the parse tree scanning unit 101. The index value 0 in the index processing unit 103 is cleared to 0. Nothing is yet to be generated as output data. FIG. 21 shows an internal state and output of the message processing device 10 at a time point when Step 4 is completed (in FIG. 21, linked fields are illustrated as being connected with a dotted line for the convenience of space on paper).

Step 5 (at a time point of reception of a message up to 1605)

The parse tree scanning unit 101 scans a node 1708 of the parse tree to sense that the input element "content" is of the sequence type. Nothing is yet to be generated as output data. FIG. 22 shows an internal state and output of the message processing device 10 at a time point when Step 5 is completed (in FIG. 22, linked fields are illustrated as being connected with a dotted line for the convenience of space of paper).

Step 6 (at a time point of reception of a message up to 1606)

The parse tree scanning unit 101 scans a node 1709 of the parse tree to sense that the input element "name" is of the printable string type. The value "foo" of the element "name" is encoded as 3-octet field '666F6F' (hexadecimal). In addition, since the element "name" has no constraint, encoding a length is necessary and therefore the length 3 is encoded as 1-octet field '03' (hexadecimal). A field '03666F6F' (hexadecimal) obtained by the encoding result of the length and the encoding result of the value linked together is stored in the output buffer at the number 1 in the parse tree scanning unit 101. FIG. 23 shows an internal state and output of the message processing device 10 at a time point when Step 6 is completed (in FIG. 23, linked fields are illustrated as being connected with a dotted line for the convenience of space of paper).

Step 7 (at a time point of reception of a message up to 1607)

The parse tree scanning unit 101 scans a node 1710 of the parse tree to sense that the input element "age" is of the integer type and that an obtainable value is limited to be not less than 0. Since an obtainable value is limited to be not less than 0, encode offset 26 from 0 to the value 26 of "age" as 1-octet field '1A' (hexadecimal). In addition, since with the limitation on the range of values not less than 0, the maximum number of octets necessary for encoding a value can not be settled, and therefore length should be encoded. The length 1 is encoded as 1-octet field '01'. A field '011A' (hexadecimal) obtained by the encoding result of the length and the encoding result of the value linked together is generated and is linked to the field stored in the output buffer at the number 1 of the parse tree scanning unit 101. Nothing is yet to be generated as output data. FIG. 24 shows an internal state and output of the message processing device 10 at a time point when Step 7 is completed (in FIG. 24, linked fields are illustrated as being connected with a dotted line for the convenience of space of paper).

Step 8 (at a time point of reception of a message up to 1608)

Figure 25:
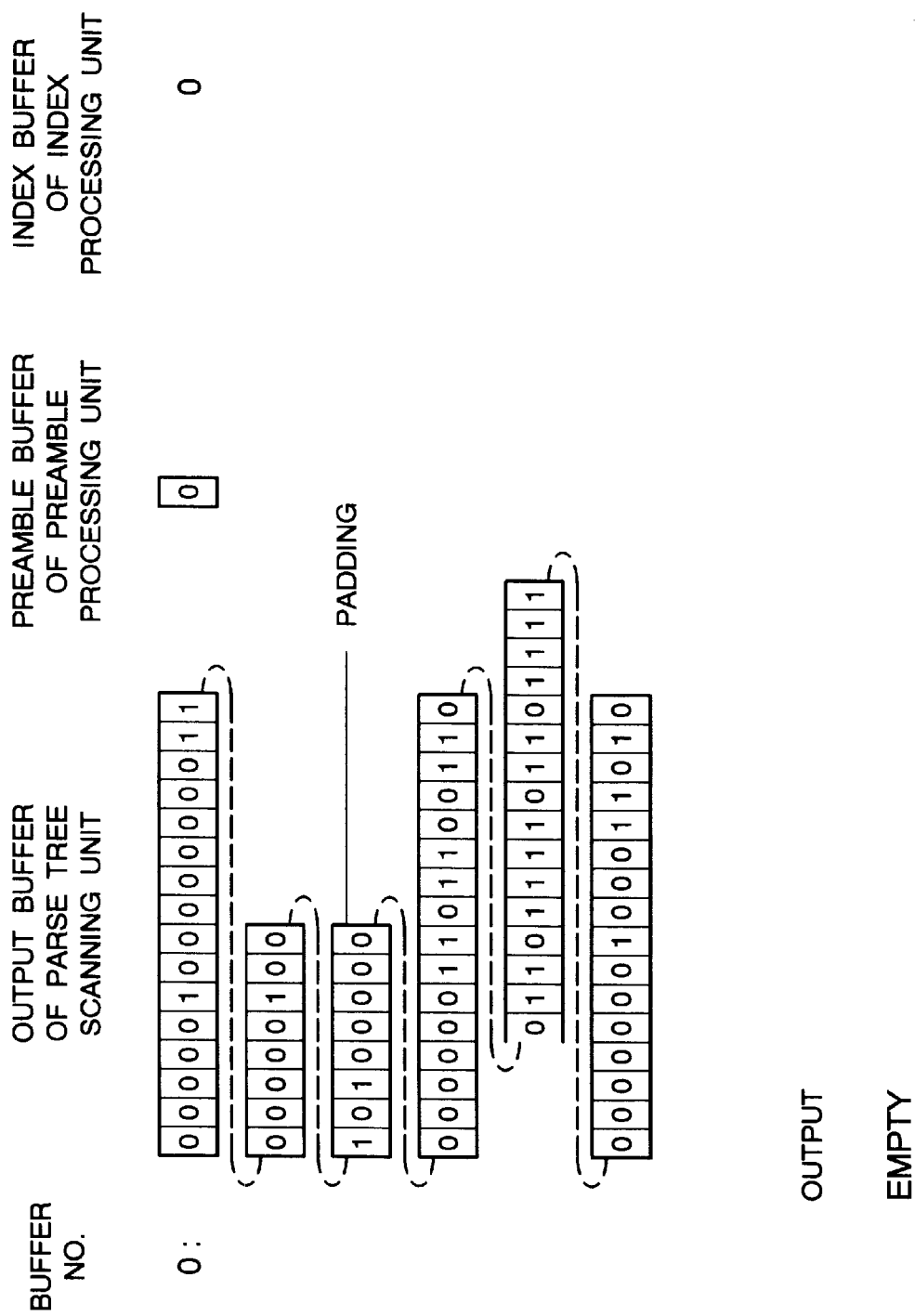
FIG. 25 is a diagram showing, in the embodiment of the message processing device according to the present embodiment, an internal state and output of the message processing device at a time when Step 8 is completed in the encoding of the message of FIG. 16.

The parse tree scanning unit 101 senses that the scanning of the subtree with the node 1708 as a root is all completed (which means encoding of the elements contained in the sequence-type element "content" is completed) and links the field stored in the output buffer at the number 1 of the parse tree scanning unit 101 with the field stored in the output buffer at the number 0 to clear the contents of the output buffer at the number 1. At the time of linking the fields, padding is conducted for aligning the fields on octet boundaries. FIG. 25 shows an internal state and output of the message processing device 10 at a time point when Step 8 is completed (in FIG. 25, linked fields are illustrated as being connected with a dotted line for the convenience of space of paper).

Step 9 (at a time point of reception of a message up to 1609)

The parse tree scanning unit 101 scans a node 1711 of the parse tree to sense that the input element "trailer" is of the octet string type, that lengths of values are limited to be not less than 0 and not more than 15 and that the element is designated as optional. Here, the parse tree scanning unit 101 gives an instruction to the preamble processing unit 102, whereby the preamble processing unit 102 generates a 1-bit bit field and links the same to a bit field in the preamble buffer at the number 0. Since the input element is "trailer", the parse tree scanning unit 101 gives an instruction to the preamble processing unit 102, whereby the preamble processing unit 102 sets the contents of the generated bit field to '1'.

Figure 26:
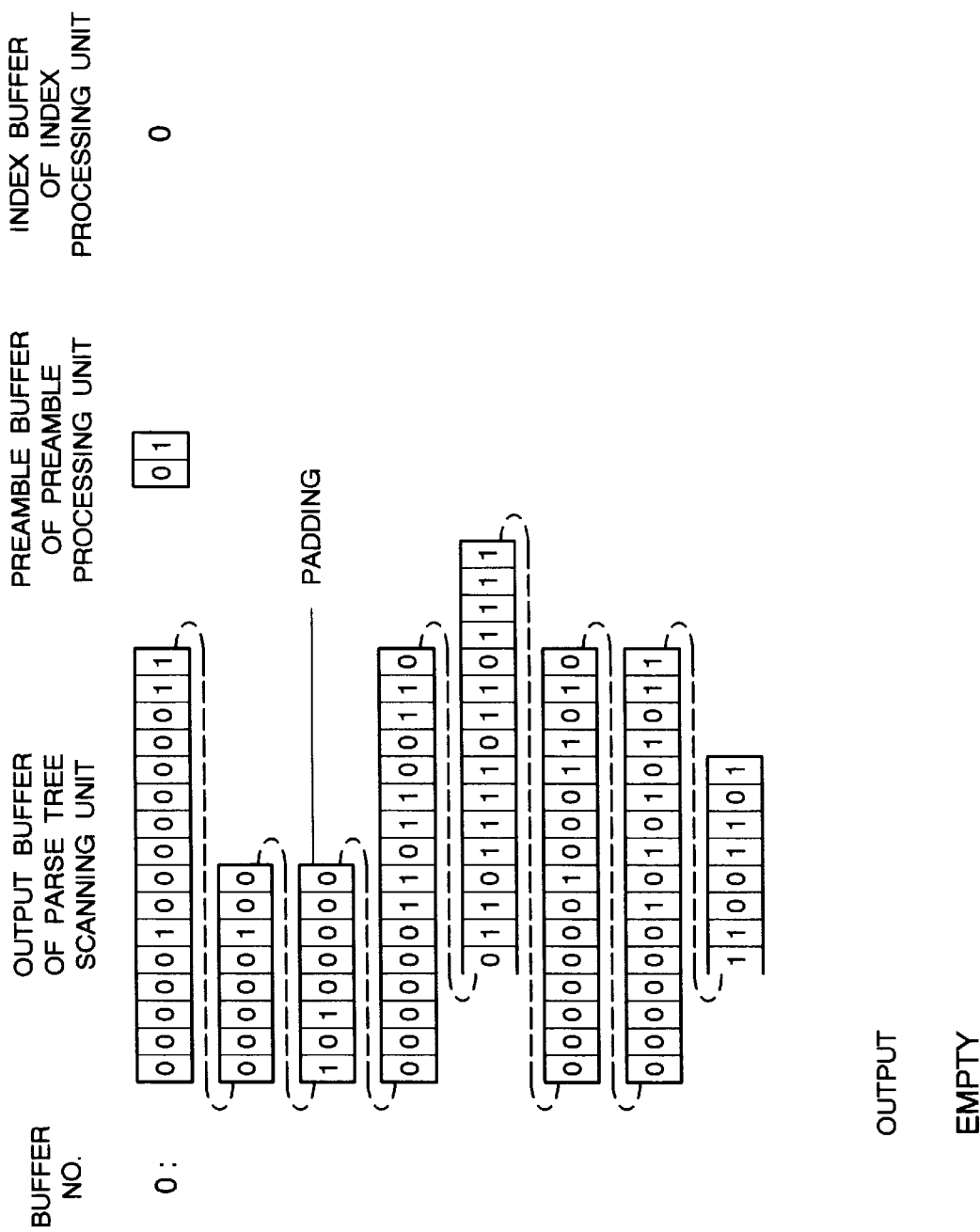
FIG. 26 is a diagram showing, in the embodiment of the message processing device according to the present embodiment, an internal state and output of the message processing device at a time when Step 9 is completed in the encoding of the message of FIG. 16.

Next, the parse tree scanning unit 101 encodes the value ABCD'H as 2-octet field 'ABCD' (hexadecimal). Here, since the range of length values is 16, encoding of a length is necessary. The length 2 is encoded as 1-octet field '02' (hexadecimal). A field '02ABCD' (hexadecimal) obtained by the encoding result of the length and the encoding result of the value linked together is generated and linked with a field stored in the output buffer at the number 0 of the parse tree scanning unit 101. Nothing is yet to be generated as output data. FIG. 26 shows an internal state and output of the message processing device 10 at a time point when Step 9 is completed (in FIG. 26, linked fields are illustrated as being connected with a dotted line for the convenience of space of paper).

Step 10 (at a time point of reception of a message up to 1610)

Figure 27:
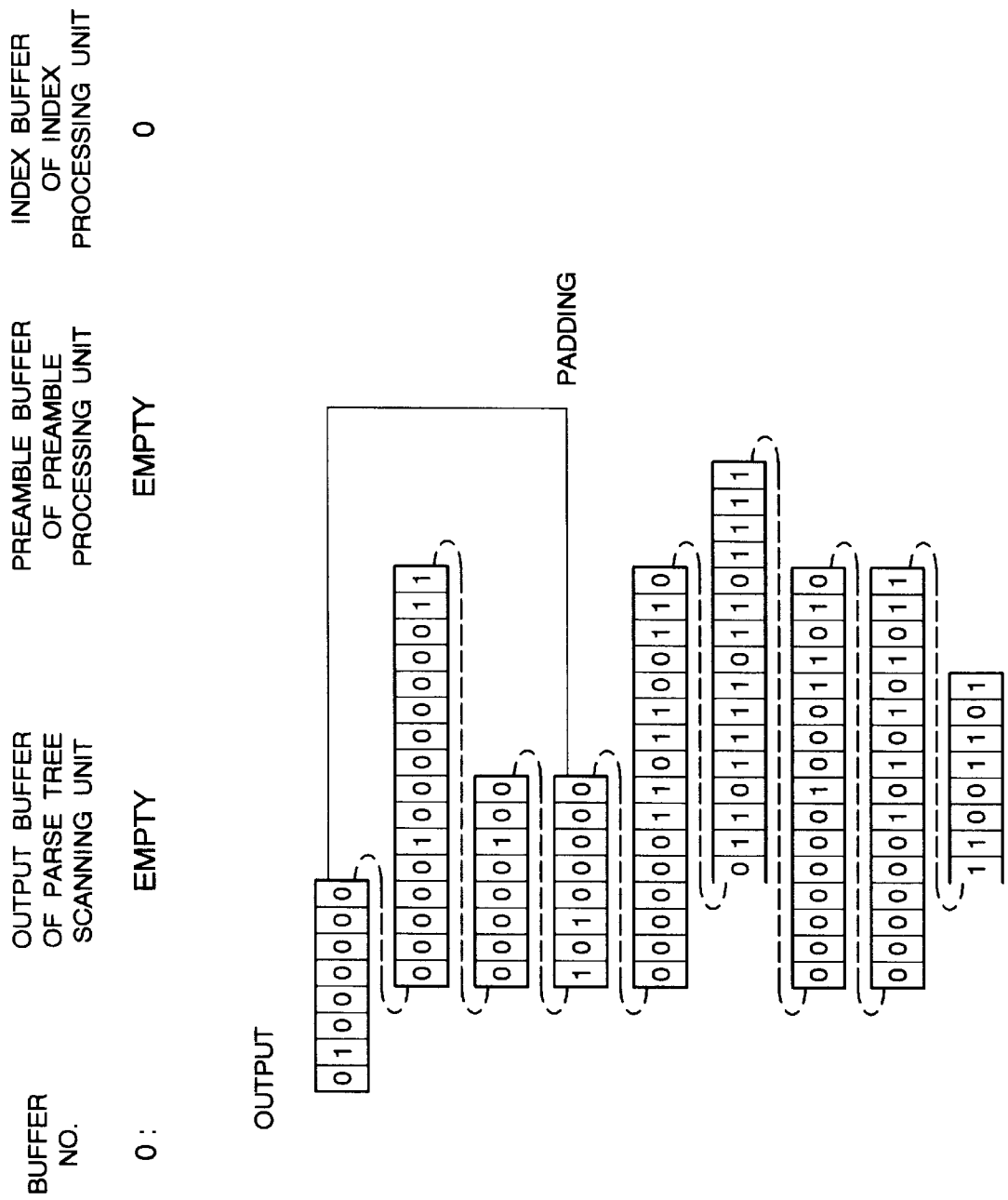
FIG. 27 is a diagram showing, in the embodiment of the message processing device according to the present embodiment, an internal state and output of the message processing device at a time when Step 10 is completed in the encoding of the message of FIG. 16.

The parse tree scanning unit 101 senses that the scanning of the parse tree is all completed to link and output the field stored in the preamble buffer at the number 0 of the preamble processing unit 102 and the field stored in the output buffer at the number 0 of the parse tree scanning unit 101. Also clear the contents of the output buffer at the number 0 of the parse tree scanning unit 101 and the contents of the preamble buffer at the number 0 of the preamble processing unit 102. At the time of linking the fields, padding is conducted for aligning the fields on the octet boundaries. FIG. 27 shows an internal state and output of the message processing device 10 at a time point when Step 10 is completed (in FIG. 27, linked fields are illustrated as being connected with a dotted line for the convenience of space of paper).

Final results of encoding obtained by the message processing device 10 of the present embodiment are shown in FIG. 28 (in FIG. 28, linked fields are illustrated as being connected with a dotted line for the convenience of space of paper).

Next, consideration will be given to decoding of a message represented by the ASN.1 transfer syntax of FIG. 28. Description will be made for each step in the following.

Step 1 (at a time point of reception of a message up to 2801)

The parse tree scanning unit 101 scans the node 1701 of the parse tree to sense that Example 2 is of the sequence type. The preamble processing unit 102 reads a preamble field '01' (binary) and stores the same in the preamble buffer at the number 0 in the preamble processing unit 102 to initialize a variable i indicative of a bit position in the preamble field to 0.

Step 2 (at a time point of reception of a message up to 2802)

The parse tree scanning unit 101 scans the node 1702 of the pares tree to sense that "id" is of the integer type and that an obtainable value is limited to be not less than 0 and not more than 1023. Since the range of obtainable values is 1024, the parse tree scanning unit 101 further reads two octets of input data '0003' (hexadecimal) and decodes the same to obtain the value 3. Since the lower bound of obtainable values is 0, output the value 3 obtained by adding 0 and 3 as the value of "id".

Step 3 (at a time point of reception of a message up to 2803)

The parse tree scanning unit 101 scans the node 1703 of the parse tree to sense that "subid" is of the integer type, that obtainable values are limited to be not less than 0 and not more than 1023 and that "subid" is designated as optional. The preamble processing unit 102 here examines an i-th bit of the preamble field to sense that the bit is '0'. The preamble processing unit 102 instructs the parse tree scanning unit 101 to scan the next node. The unit 102 also adds 1 to the value of i to have the value 1.

The parse tree scanning unit 101 scans the node 1704 of the parse tree to sense that "length" is of the integer type and that an obtainable value is limited to be not less than 0 and not more than 255. Since the range of obtainable values is 256, the parse tree scanning unit 101 further reads one octet of input data '04' (hexadecimal) and decodes the same to obtain the value 4. Since the lower bound of obtainable values is 0, output the value 4 obtained by adding 0 and 4 as the value of "length".

Step 4 (at a time point of reception of a message up to 2804)

The parse tree scanning unit 101 scans the node 1705 of the parse tree to sense that the value to be decoded next is of the choice type. The index processing unit 103 reads the index field '1' (binary) and decodes the same to obtain the index value of 1. The unit 103 also initializes a variable i which temporarily holds the index to 0. The parse tree scanning unit 101 scans the node 1706 of the parse tree to sense that "content-name" is of the printable string type. Here, the index processing unit 103 compares i and the index value to find that they are 0 and 1, different, and accordingly instructs the parse tree scanning unit 101 to scan the next node and adds 1 to i to have the value 1.

The parse tree scanning unit 101 scans the node 1707 of the parse tree to sense that "content-type" is of the integer type and that obtainable values are limited to be not less than 0 and not more than 15. Here, the index processing unit 103 compares i and the index to find that they are 1 and 1, equal, and accordingly instructs the parse tree scanning unit 101 to decode the value. Since the range of obtainable values is 16, the parse tree scanning unit 101 further reads four bits of input data '0100' and decodes the same to obtain the value 4. Since the lower bound of obtainable values is 0, output the value 4 obtained by adding 0 and 4 as the value of "content-type".

Step 5 (at a time point of reception of a message up to 2805)

The parse tree scanning unit 101 scans the node 1708 to sense that "content" is of the sequence type. Since no preamble field exists, the preamble processing unit conducts nothing. Next, the parse tree scanning unit 101 scans the node 1709 of the parse tree to sense that "name" is of the printable string type. Since no constraint is imposed on the element "name", the parse tree scanning unit 101 first reads the length field '03' (hexadecimal) and decodes the same to obtain the value 3. The unit 101 accordingly senses that the number of octets of the value field is 3. The parse tree scanning unit 101 further reads three octets of input data '666F6F' (hexadecimal) and decodes the same to obtain the value "foo". Output the value "foo" as the value of "name".

Step 6 (at a time point of reception of a message up to 2806)

The parse tree scanning unit 101 scans the node 1710 of the parse tree to sense that "age" is of the integer type and that obtainable values are limited to be not less then 0. Since obtainable values are limited to be not less than 0, the parse tree scanning unit 101 first reads the length field '01' (hexadecimal) and decodes the same to obtain the value 1. The unit 101 accordingly senses that the number of octets of the value field is 1. The parse tree scanning unit 101 further reads one octet of input data '1A' (hexadecimal) and decodes the same to obtain the value 26. Since obtainable values are limited to be not less than 0, output the value 26 obtained by adding 0 and 26 as the value of "age".

Step 7 (at a time point of reception of a message up to 2807)

The parse tree scanning unit 101 scans the node 1711 of the parse tree to sense that "trailer" is of the octet string type, that lengths of values are limited to be not less than 0 and not more than 15 and that the element is designated as optional. The preamble processing unit 102 here examines an i-th bit of the preamble field to sense that it is '1'. The preamble processing unit 102 instructs the parse tree scanning unit 101 to decode the value. In addition, the unit 102 adds 1 to the value of i to have 2. Since lengths of obtainable values are limited to be not less than 0 and not more than 15, the parse tree scanning unit 101 first reads the length field '02' (hexadecimal) and decodes the same to obtain the value 2. The unit 101 accordingly senses that the number of octets of the value field is two. The parse tree scanning unit 101 further reads two octets of input data 'ABCD' (hexadecimal) and decodes the same to obtain the value ABCD'H. Output the value ABCD'H as the value of "trailer".

A decoding result finally obtained by the message processing device 10 of the present embodiment is the ASN.1 value notation shown in FIG. 16.

Next, a second embodiment will be described. In the first embodiment, no specific description has been made of a mode in which the parse tree 105, which is held by the parse tree holding unit 104 of the message processing device 10, is held in a storage region and therefore an arbitrary mode such as a list form can be taken. FIG. 29 shows a mode in which the parse tree 105 is held in a storage region of the parse tree holding unit 104 in the second embodiment. As illustrated in the figure, successive arrangement of nodes of the parse tree 105 on the storage region enables the preamble processing unit 102 and the index processing unit 103 to instruct the parse tree scanning unit 101 to scan only a node to be scanned.

Figure 30:
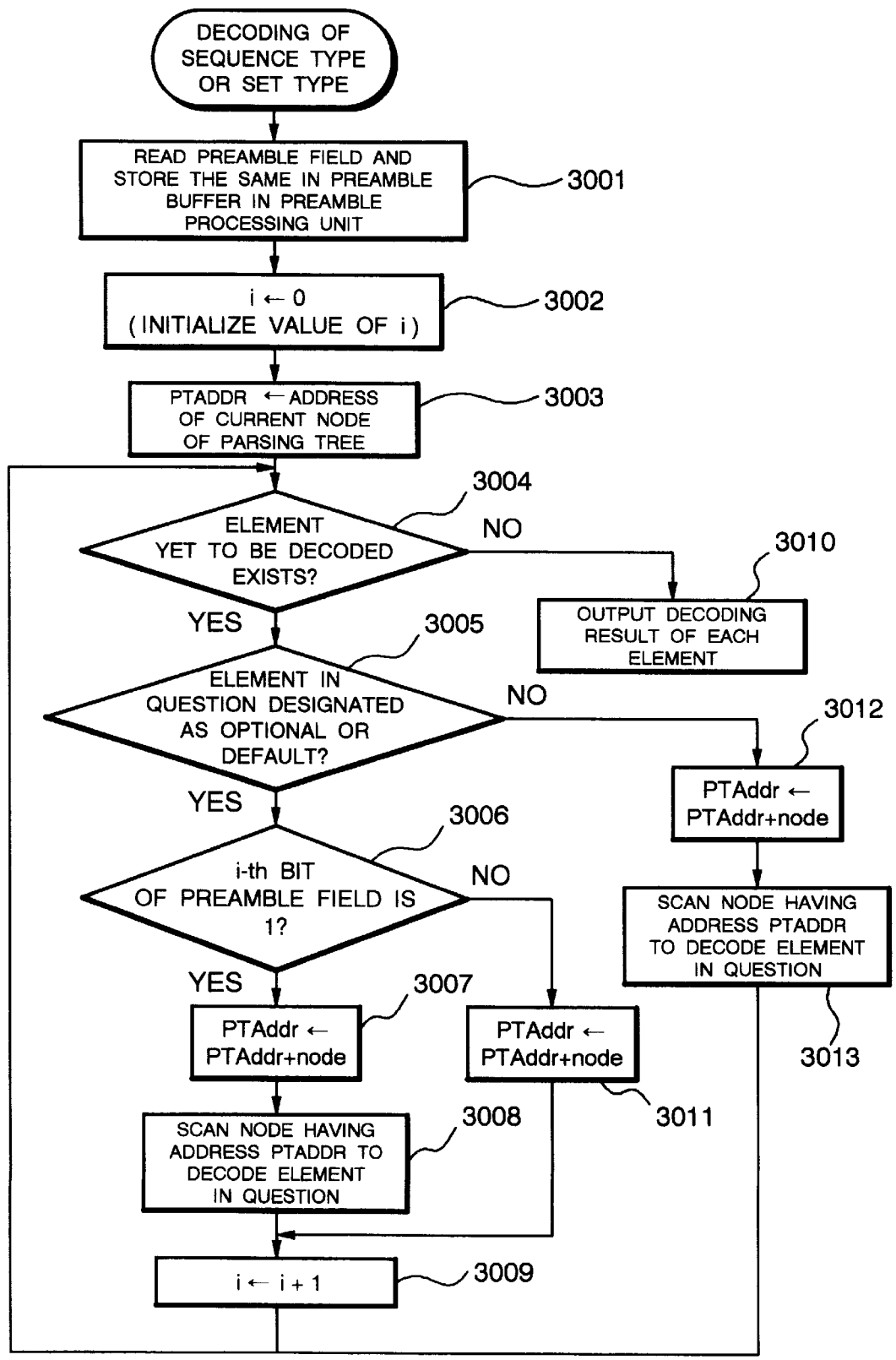
FIG. 30 is a flow chart showing a flow of processing to be conducted for decoding a sequence-type or set-type value in the second embodiment of the message processing device according to the present embodiment.
Figure 32:
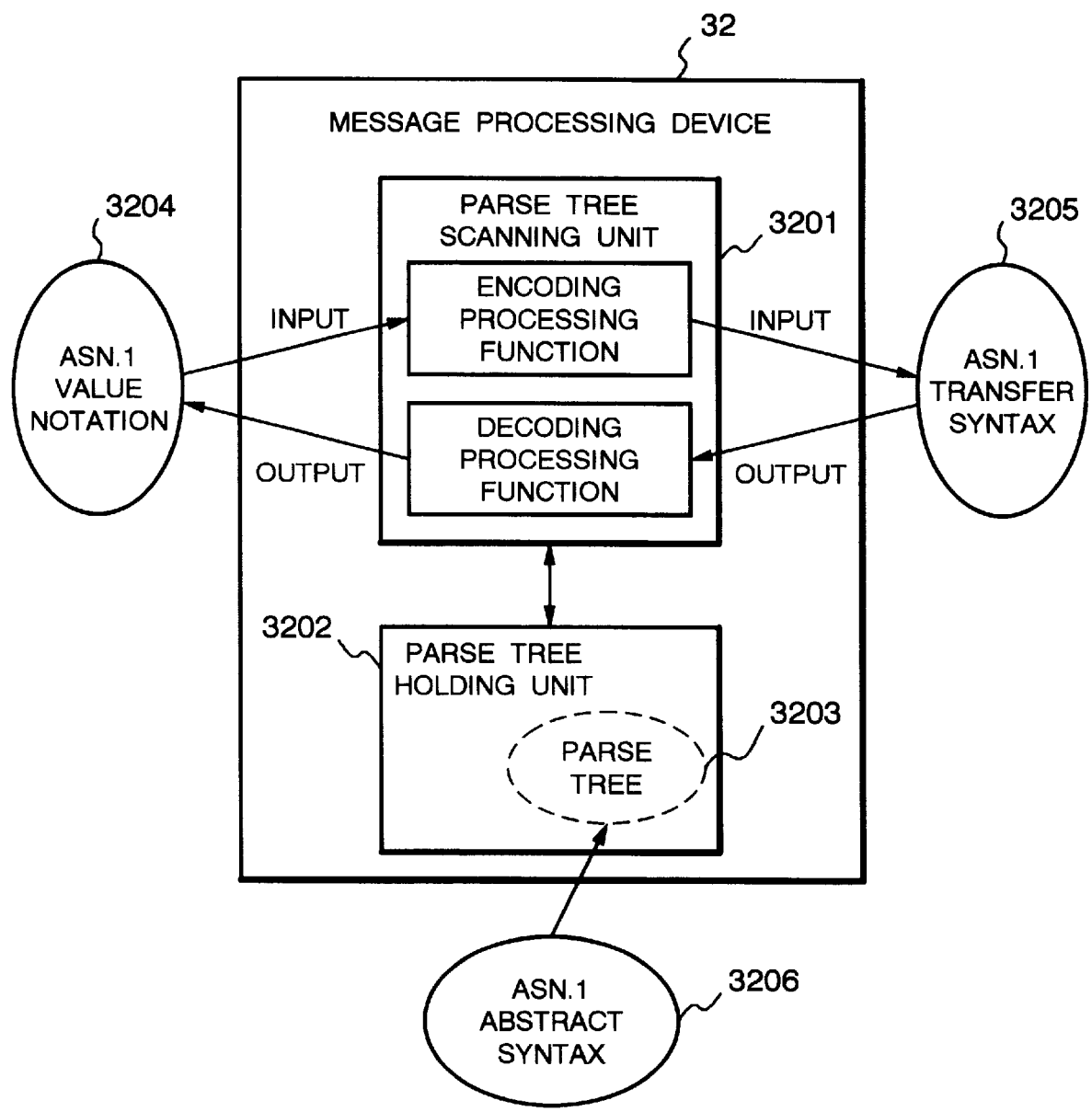
FIG. 32 is a block diagram showing structure of a conventional message processing device.
Figure 34:
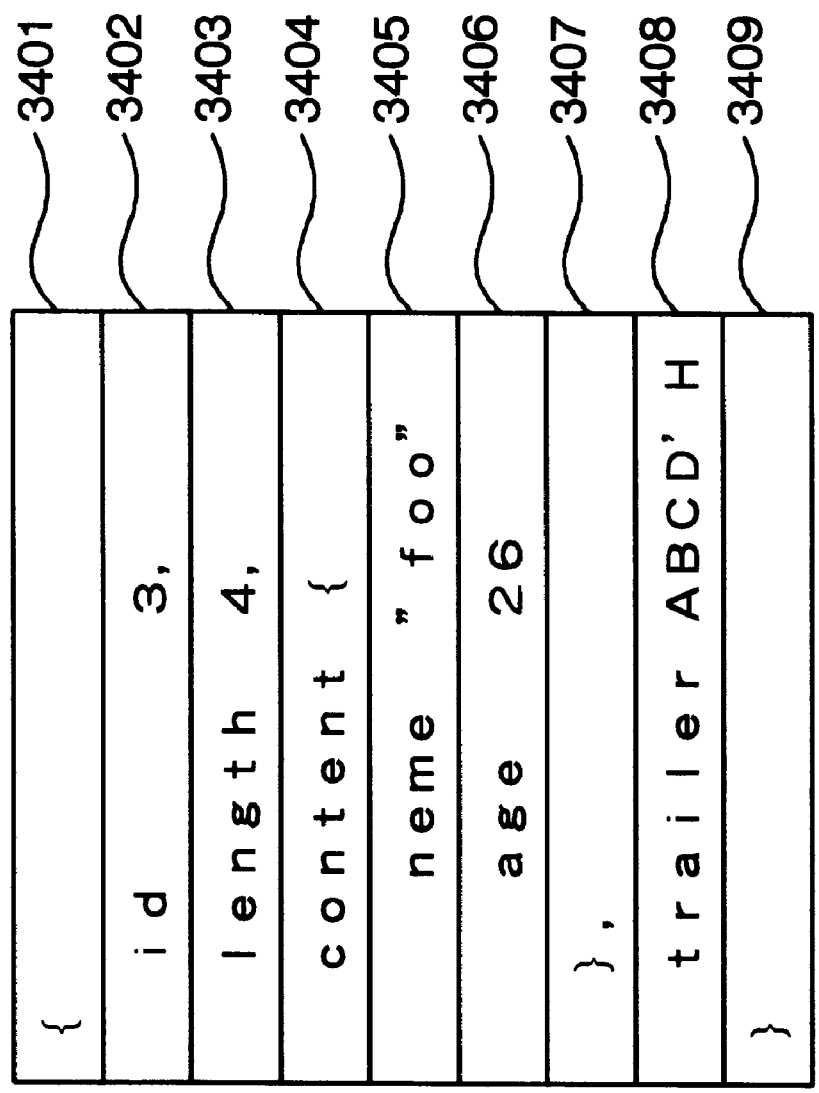
FIG. 34 is a diagram showing an example of value notation of a message defined by the abstract syntax of FIG. 33.
Figure 35:
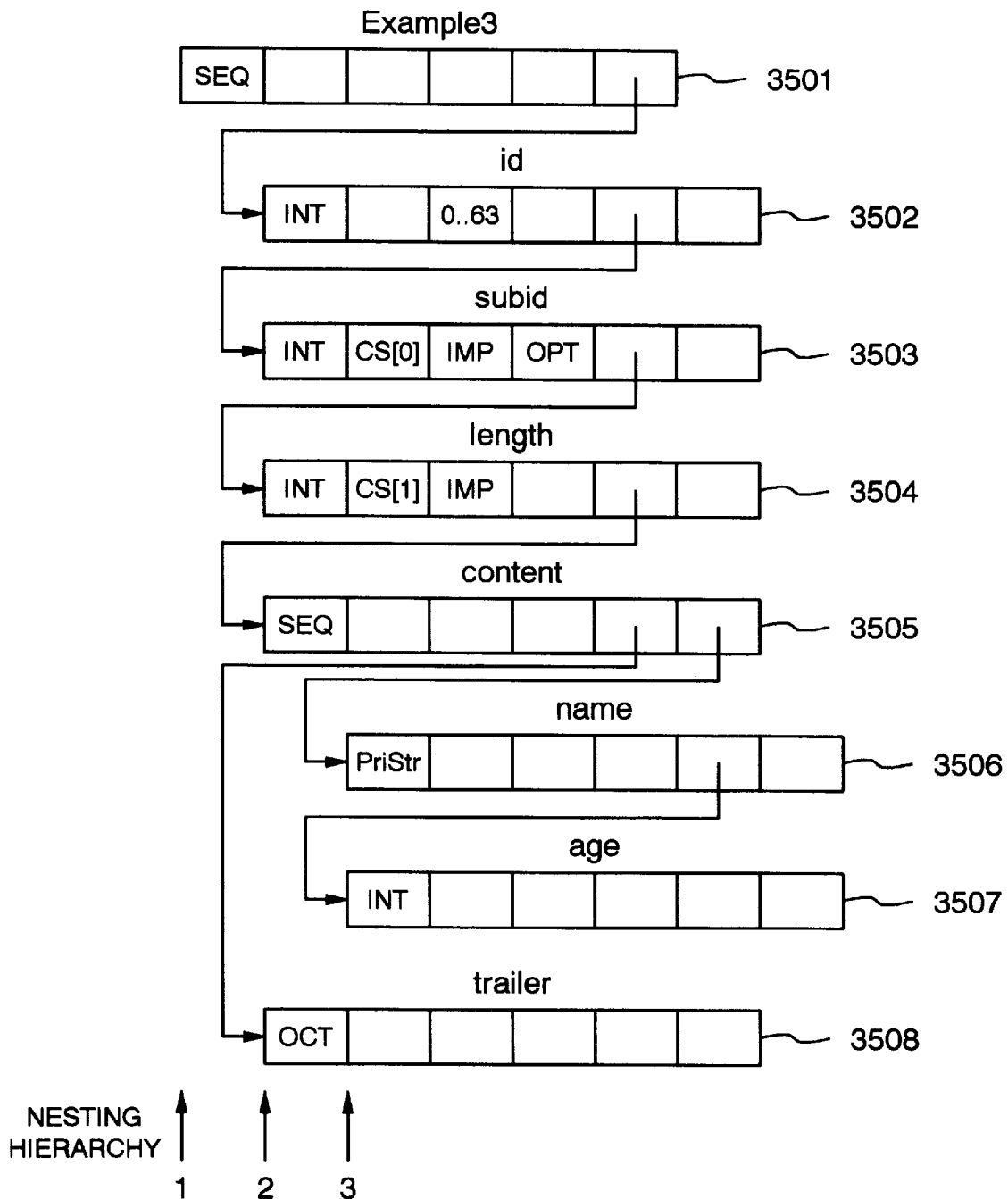
FIG. 35 is a diagram showing a parse tree generated based on the abstract syntax of FIG. 33.
Figure 36:
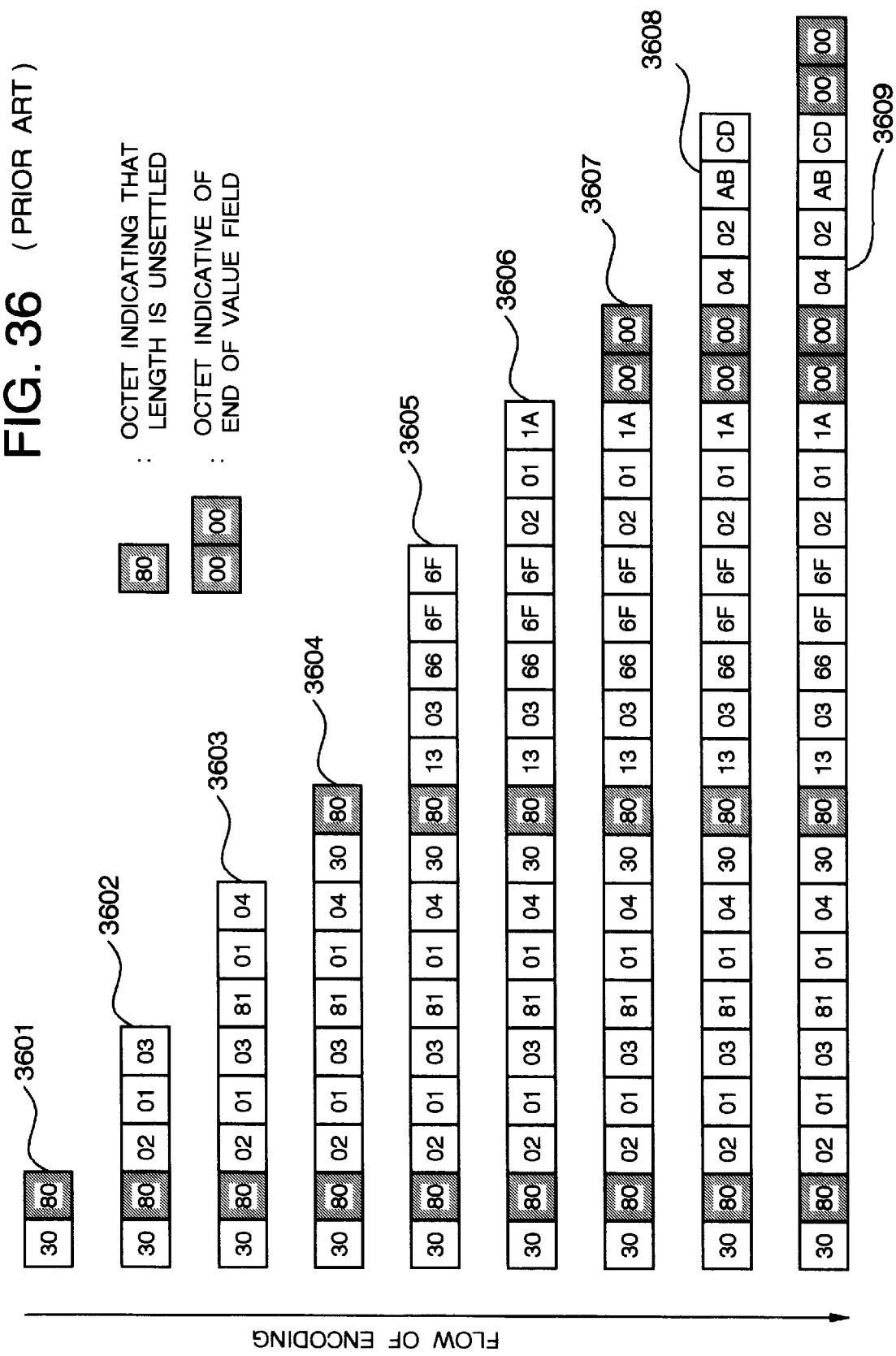
FIG. 36 is a diagram showing a flow of encoding processing for encoding the message of FIG. 34 by the conventional message processing device.

A flow chart of the processing for decoding the sequence-type or set-type value in the second embodiment is shown in FIG. 30 (a flow of the processing for encoding is the same as that of the first embodiment and is shown in FIG. 9).

Upon application of the ASN.1 transfer syntax 107 (input data to be decoded), first read a preamble field and store the same in a preamble buffer in the preamble processing unit 102 (Step 3001). Next, initialize a variable i indicative of a bit position in the preamble field to 0 (Step 3002). Next, store an address of a node of the parse tree 105 being currently scanned in a variable PTAddr (Step 3003). Next, examine whether there remains an element yet to be decoded (Step 3004). If no element yet to be decoded remains, output a decoding result of each element (Step 3010). If there is an element yet to be decoded, examine whether the element in question is designated as optional or default (Step 3005).

If the element is designated neither as optional nor as default, add "node" (size of a storage region necessary for holding one node of the parse tree 105) to PTAddr (Step 3012), whereby the parse tree scanning unit 101 scans a node of the parse tree referred to by the address PTAddr and decodes the element in question (Step 3013) to return to Step 3004. If the element is designated as optional or default, the preamble processing unit 102 examines whether an i-th bit of the preamble field is '1' (Step 3006). If the bit is not '1', add "node" to PTAddr (step 3011) and add 1 to i (Step 3009) to return to Step 3004. If the bit is '1', add "node" to PTAddr (Step 3007), so that the parse tree scanning unit 101 scans a node of the parse tree referred to by the address PTAddr to decode the element in question (Step 3008) and add 1 to i (Step 3009) to return to Step 3004.

Next, a flow chart of the processing for decoding the choice type in the second embodiment is shown in FIG. 31 (a flow of the processing for encoding is the same as that of the first embodiment and is shown in FIG. 12). Upon application of the ASN.1 transfer syntax 107 (input data to be decoded), first read an index field and store the index in an index buffer in the index processing unit 103 (Step 3101). Next, decode an index from the read index field to obtain an index value i (Step 3102). Next, store an address of a node of the parse tree 105 being currently scanned in a variable PTAddr (Step 3103). Next, scan a node of the parse tree referred to by an address PTAddr+node*i to decode the element in question (Step 3104).

Although the present invention has been described with respect to preferred embodiments in the foregoing, the present invention is not necessarily limited to the above-described embodiments.

Thus structured message processing device of the present invention enables a message to be handled according to encoding rules for compressing an encoding data length which can not be used by conventional message processing devices and, more particularly, enables message encoding and decoding according to PER by the addition of a preamble processing unit and an index processing unit to a conventional message processing device.

More specifically, in a case of handling sequence-type and set-type values, when an element designated as optional or default exists, according to the encoding rules for compressing an encoding data length, a field called a preamble is provided to indicate whether an element designated as optional or default exists or not in place of encoding of a tag which is used in a conventional message processing device and a preamble processing unit handles said preamble to send and receive instructions to and from a parse tree scanning unit, thereby enabling an element designated as optional or default to be handled without using a tag. It is therefore possible to encode and decode a message without generating a redundant tag field when handling sequence-type and set-type elements.

Also when handling a choice-type value, finding to what number of element the choice-type value corresponds without the use of a tag is enabled by the provision of a field called index and handling of said index by an index processing unit to send and receive instructions to and from a parse tree scanning unit. It is therefore possible, when handling a choice-type element, to encode and decode a message without generating a redundant tag field.

Furthermore, changing a format of a node of a parse tree so as to hold constraints information indicative of a range of obtainable values and a range of lengths of the values of each element represented by the ASN.1 abstract syntax enables the parse tree scanning unit to compress an encoding data length using said constraints information. It is therefore unnecessary to use a redundant length field and accordingly possible to compress the contents of a value field as well.

As described in the foregoing, according to the message processing device, the method thereof and a storage medium which stores a message processing control program of the present invention, introduction of a preamble processing unit and an index processing unit enables encoding and decoding of a message in accordance with encoding rules for compressing the contents of encoding data, PER, in particular.

As a result, it is possible to reduce a volume of data sent and received in an environment in which messages are sent and received between different kinds of devices. The reason is that in the message processing device of the present invention, neither a redundant tag field nor a redundant length field is generated and as to a value field, encoding data length is compressed using constraints in the ASN.1 abstract syntax. Because of the reduction in the volume of data sent and received, the message processing device of the present invention enables efficient communication even when a channel for exchanging messages has a limited capacity.

Also, in an application requiring high-speed data transfer, satisfactory performance can be achieved. The reason is that by generating neither a redundant tag field nor a redundant length field, a time overhead for generating a redundant field is eliminated.

Furthermore, even with a smaller storage region, message encoding and decoding is possible. The reason is that generating neither a redundant tag field nor a redundant length field and as to a value field, compressing its contents using constraints leads to reduction in a buffer region for temporarily holding a message before the message is sent out to a channel.

Moreover, it is possible to minimize a delay time from when a message to be processed is applied to the device until when a desired result is obtained. The reason is that no generation of redundant tag field and length field eliminates a time overhead for generating a redundant field which can not be eliminated by a conventional message processing device. This effect allows application of the message processing device of the present invention also to a real-time system or the like in which stringent constraints are imposed on a time from when a message is applied to the device until when a desired result is obtained.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A message processing device for sending and receiving a message composed of one or more elements between different kinds of devices, comprising:

parse tree holding means having a function of holding a parse tree generated from syntax descriptions defining structure of a message sent or received;

parse tree scanning means connected to said parse tree holding means and having a function of, as message data to be processed is applied, scanning said parse tree to encode and decode a value and outputting encoded and decoded values;

preamble processing means connected to said parse tree scanning means and having a function of processing a preamble field of a message for use in indicating whether an element exists or not in message data sent or received; and index processing means connected to said parse tree scanning means and having a function of processing an index field of a message for use in indicating what number of element is selected in message data whose one of a plurality of elements is selected to be sent or received.

2. The message processing device as set forth in claim 1, wherein said preamble processing means comprises:

a counter having a function of receiving input of a signal indicating whether a node being scanned is omissible and when said signal indicates that the node is omissible, counting up a count value and outputting the count value, a decoder having a function of decoding a count value of said counter and outputting the decoded value as a write enable signal to each of flip-flops constituting a register which will be described later, a first multiplexer having a function of receiving input of a signal indicating which processing of encoding and decoding is being executed, and when the signal indicates encoding, outputting a signal indicating whether an element corresponding to a node in the parse tree being scanned exists or not to a register which will be described later and when the signal indicates decoding, outputting a preamble field input signal, a register having a function of receiving input of the signal from said first multiplexer and the write enable signal from said decoder, and for a flip-flop to which said write enable signal is effective, reading the signal from said multiplexer and holding the contents of the signal and for a flip-flop to which said write enable signal is not effective, keeping holding the currently held contents, as well as outputting the currently held contents as a preamble field output signal, and a second multiplexer having a function of receiving input of the preamble field output signal from said register and the count value from said counter and outputting the contents of a bit at a bit position corresponding to the count value in a preamble field as an instruction signal giving an instruction to decode an element corresponding to the subsequent node.

3. The message processing device as set forth in claim 1, wherein said index processing means comprises:

a counter having a function of receiving input of a signal indicating whether a node of the parse tree corresponding to a message whose one of a plurality of elements is selected to be sent or received is being scanned and when the node in question is being scanned, counting up a count value and outputting the count value to a first register and a comparator which will be described later, as well as outputting the count value as an index value output signal, a first register having a function of receiving input of said count value and a signal indicating whether a node corresponding to a selected element of a message whose one of a plurality of elements is selected to be sent or received is being scanned or not, and when the node in question is being scanned, outputting the currently held contents as an index field output signal and when the node in question is not being scanned, holding said count value, a second register having a function of receiving input of an index field input signal and holding said index field input signal, as well as outputting the currently held contents, and a comparator having a function of receiving input of said count value and the signal from said second register and comparing the contents of the two, and when the contents coincide with each other, outputting an instruction signal giving an instruction to decode a value of an element corresponding to a node of the parse tree corresponding to the currently output index value.

4. The message processing device as set forth in claim 1, wherein said preamble processing means handles a preamble to instruct said parse tree scanning means to scan only a node of the parse tree corresponding to an element existing n message data sent or received, thereby eliminating the need of scanning of a node whose scanning is not required.

5. The message processing device as set forth in claim 1, wherein said preamble processing means comprises:

a counter having a function of receiving input of a signal indicating whether a node being scanned is omissible and when said signal indicates that the node is omissible, counting up a count value and outputting the count value, a decoder having a function of decoding a count value of said counter and outputting the decoded value as a write enable signal to each of flip-flops constituting a register which will be described later, a first multiplexer having a function of receiving input of a signal indicating which processing of encoding and decoding is being executed, and when the signal indicates encoding, outputting a signal indicating whether an element corresponding to a node in the parse tree being scanned exists or not to a register which will be described later and when the signal indicates decoding, outputting a preamble field input signal, a register having a function of receiving input of the signals from said first multiplexer and the write enable signal from said decoder, and for a flip-flop to which said write enable signal is effective, reading the signal from said multiplexer and holding the contents of the signal and for a flip-flop to which said write enable signal is not effective, keeping holding the currently held contents, as well as outputting the currently held contents as a preamble field output signal, and a second multiplexer having a function of receiving input of the preamble field output signal from said register and the count value from said counter and outputting the contents of a bit at a bit position corresponding to the count value in a preamble field as an instruction signal giving an instruction to decode an element corresponding to the subsequent node, and said preamble processing means handles a preamble to instruct said parse tree scanning means to scan only a node of the parse tree corresponding to an element existing in message data sent or received, thereby eliminating the need of scanning of a node whose scanning is not required.

6. The message processing device as set forth in claim 1, wherein in the encoding of a message, when message date is applied, examination is made whether an element yet to be encoded exists in the message data or not, when there is no element yet to be encoded, an encoding result of each element linked after a preamble is output as an encoding result, when an element yet to be encoded exists, said parse tree scanning means scans a subsequent node of the parse tree to examine whether the element in question is an omissible element or not, when the element in question is not an omissible element, said parse tree scanning means examines whether the node in question is a node corresponding to the element yet to be encoded and when the node in question is not the corresponding node, the routine again returns to the examination whether an element yet to be encoded exists or not, when the node is the corresponding node, the element in question is encoded to again return to the examination whether an element yet to be encoded exists or not, when the element in question is an omissible element, said parse tree scanning means gives an instruction to said preamble processing means to generate a 1-bit field in said preamble processing means which field is then linked to the trail of the existing preamble and said parse tree scanning means examines whether the node in question is a node corresponding to the element yet to be encoded, and when the node is not the corresponding node, said parse tree scanning means gives an instruction to said preamble processing means to set the contents of the field generated in said preamble processing means to the contents indicating that "omissible element is omitted" and again return to the examination whether an element yet to be encoded exists, and when the node in question is a node corresponding to the element yet to be encoded, said parse tree scanning means gives an instruction to said preamble processing means to set the contents of the field generated in said preamble processing means to the contents indicating that "omissible element is not omitted" and encodes the element in question to again return to the examination whether an element yet to be encoded exists.

7. The message processing device as set forth in claim 1, wherein in the decoding of a message, when message data is applied, first a preamble field is read and stored in said preamble processing means, a variable indicative of a bit position in the preamble field is initialized to 0, examination is made whether there exists an element yet to be decoded in the message data, when no element yet to be decoded exists, a decoding result of each element is output, when an element yet to be decoded exists, said parse tree scanning means scans the subsequent node of the parse tree to examine whether an element corresponding to the node in question is an omissible element and when the element in question is not an omissible element, decodes the element in question to again return to the examination whether an element yet to be decoded exists, when the element in question is an omissible element, if the contents of the current bit position in the preamble field indicate that "omissible element is omitted", 1 is added to a variable indicative of the current bit position to return to the examination whether an element yet to be decoded exists, and if the contents of the current bit position in the preamble field indicate that "omissible element is not omitted", the element in question is decoded and 1 is added to the variable indicative of the current bit position to return to the examination whether an element yet to be decoded exists.

8. The message processing device as set forth in claim 1, wherein said preamble processing means handles a preamble to instruct said parse tree scanning means to scan only a node of the parse tree corresponding to an element existing in message data sent or received, thereby eliminating the need of scanning of a node whose scanning is not required, the parse tree is stored in a continuous region on a storage region of said parse tree holding means, and in the decoding of a message, when message data is applied, first a preamble field is read and stored in said preamble processing means, a variable indicative of a bit position in the preamble field is initialized to 0, an address of a node being currently scanned is stored in a variable indicative of an address of a node of the parse tree, examination is made whether there exists an element yet to be decoded in the message data, when no element yet to be decoded exists, a decoding result of each element is output, when an element yet to be decoded exists, examination is made whether the element in question is an omissible element and when the element in question is not an omissible element, an address of the subsequent node is stored in the variable Indicative of an address of a node of the parse tree, the node of the parse tree having the address in question is scanned and the element in question is decoded to return to the examination whether an element yet to be decoded exists, when the element in question is an omissible element, if the contents of the current bit position in the preamble field indicate that "omissible element is omitted", the address of the subsequent node is stored in the variable indicative of an address of a node of the parse tree and 1 is added to a variable indicative of the current bit position to return to the examination whether an element yet to be decoded exists, and if the contents of the current bit position in the preamble field indicate that "omissible element is not omitted", the address of the subsequent node is stored in the variable indicative of an address of a node of the parse tree, the node of the parse tree having the address in question is scanned, the element in question is decoded and 1 is added to the variable indicative of the current bit position to return to the examination whether an element yet to be decoded exists.

9. The message processing device as set forth in claim 1, wherein said index processing means handles an index to instruct said parse tree scanning means to scan only a node of the parse tree corresponding to a selected element in message data sent or received, thereby eliminating the need of scanning of a node whose scanning is not required.

10. The message processing device as set forth in claim 1, wherein in the encoding of a message, when message data is applied, examination is made whether a node of the parse tree being currently scanned is a node corresponding to a selected element and when the node is not the corresponding node, said index processing means adds 1 to a current index value and said parse tree scanning means scans the subsequent node of the parse tree to again return to the examination whether the node being scanned corresponds to the selected element, and when the node is the corresponding node, said index processing means encodes the current index value and said parse tree scanning means encodes the element in question to output the encoding results of the index value and the element in question linked together.

11. The message processing device as set forth in claim 1, wherein in the decoding of a message, when message data is applied, first an index field is read and stored in said index processing means, the contents of the index field are decoded to obtain an index value, a variable indicative of a choice number is initialized to 0, said parse tree scanning means scans a subsequent node of the parse tree, examination is made whether said variable and the index value are equal and if the two values are not equal, 1 is added to said variable to again return to scanning of a subsequent node of the parse tree, and when said variable and the index value are equal, the element in question is decoded.

12. The message processing device as set forth in claim 1, wherein said index processing means handles an index to instruct said parse tree scanning means to scan only a node of the parse tree corresponding to a selected element in message data sent or received, thereby eliminating the need of scanning of a node whose scanning is not required, the parse tree is stored in a continuous region on a storage region of said parse tree holding means, and in the decoding of a message, when message data is applied, first an index field is read and stored in said index processing means, the contents of the index field are decoded to obtain an index value, an address of a node being currently scanned is stored in a variable indicative of an address of a node of the parse tree, and said parse tree scanning means scans a node of the parse tree to be referred to by a sum of said variable and a product of the size of a storage region necessary for holding one node of the parse tree and the index value to decode the element in question.

13. The message processing device as set forth in claim 1, wherein said preamble processing means handles a preamble to instruct said parse tree scanning means to scan only a node of the parse tree corresponding to an element existing in message data sent or received, and said index processing means handles an index to instruct said parse tree scanning means to scan only a node of the parse tree corresponding to a selected element in message data sent or received, thereby eliminating the need of scanning of a node whose scanning is not required.

14. The message processing device as set forth in claim 1, wherein said parse tree holding means holds such a parse tree generated from syntax descriptions defining structure of a message sent or received as having a node format made up of six fields, "type of element", "tag attached to element", "constraints on element", "whether element is omissible", "pointer to subsequent node in the same nesting hierarchy" and "pointer to node in lower nesting hierarchy".

15. The message processing device as set forth in claim 1, wherein a message whose structure is defined by the abstract syntax notation one (ASN.1 ) is handled according to the packed encoding rules (PER).

16. A message processing method of sending and receiving a message composed of one or more elements between different kinds of devices and processing the message, comprising the steps of:

holding a parse tree generated from syntax descriptions defining structure of a message sent or received;

as message data to be processed is applied, scanning said parse tree to encode and decode a value and outputting encoded and decoded values;

processing a preamble field of a message for use in indicating whether an element exists or not in message data sent or received; and processing an index field of a message for use in indicating what number of element is selected in message data whose one of a plurality of elements is selected to be sent or received.

17. The message processing method as set forth in claim 16, wherein said message encoding step comprises the steps of:

when message data is applied, examining whether an element yet to be encoded exists in the message data or not, when there is no element yet to be encoded, outputting an encoding result of each element linked after a preamble as an encoding result, when an element yet to be encoded exists, scanning a subsequent node of the parse tree to examine whether the element in question is an omissible element or not, when the element in question is not an omissible element, examining whether the node in question is a node corresponding to the element yet to be encoded and when the node in question is not the corresponding node, again returning to the examination whether an element yet to be encoded exists or not, when the node is the corresponding node, encoding the element in question to again return to the examination whether an element yet to be encoded exists or not, when the element in question is an omissible element, generating a 1-bit field, linking the field to the trail of the existing preamble and examining whether the node in question is a node corresponding to the element yet to be encoded, and when the node is not the corresponding node, setting the contents of said generated field to the contents indicating that "omissible element is omitted" to again return to the examination whether an element yet to be encoded exists, and when the node in question is a node corresponding to the element yet to be encoded, setting the contents of said generated field to the contents indicating that "omissible element is not omitted" and encoding the element in question to again return to the examination whether an element yet to be encoded exists.

18. The message processing method as set forth in claim 16, wherein said message decoding step comprises the steps of:

when message data is applied, first reading and storing a preamble field, initializing a variable indicative of a bit position in the preamble field to 0, examining whether there exists an element yet to be decoded in the message data, when no element yet to be decoded exists, outputting a decoding result of each element, when an element yet to be decoded exists, scanning the subsequent node of the parse tree to examine whether an element corresponding to the node in question is an omissible element and when the element in question is not an omissible element, decoding the element in question to again return to the examination whether an element yet to be decoded exists, when the element in question is an omissible element, if the contents of the current bit position in the preamble field indicate that "omissible element is omitted", adding 1 to a variable indicative of the current bit position to return to the examination whether an element yet to be decoded exists, and if the contents of the current bit position in the preamble field indicate that "omissible element is not omitted", decoding the element in question and adding 1 to the variable indicative of the current bit position to return to the examination whether an element yet to be decoded exists.

19. The message processing method as set forth in claim 16, wherein in said preamble processing step, the parse tree is stored in a continuos region on a storage region, and said message decoding step comprises the steps of:

when message data is applied, first reading and storing a preamble field, initializing a variable indicative of a bit position in the preamble field to 0, storing an address of a node being currently scanned in a variable indicative of an address of a node of the parse tree, examining whether there exists an element yet to be decoded in the message data, when no element yet to be decoded exists, outputting a decoding result of each element, when an element yet to be decoded exists, examining whether the element in question is an omissible element and when the element in question is not an omissible element, storing an address of a subsequent node in the variable indicative of an address of a node of the parse tree, scanning the node of the parse tree having the address in question and decoding the element in question to return to the examination whether an element yet to be decoded exists, when the element in question is an omissible element, if the contents of the current bit position in the preamble field indicate that "omissible element is omitted", storing an address of a subsequent node in the variable indicative of an address of a node of the parse tree and adding 1 to a variable indicative of the current bit position to return to the examination whether an element yet to be decoded exists, and if the contents of the current bit position in the preamble field indicate that "omissible element is not omitted", storing an address of a subsequent node in the variable indicative of an address of a node of the parse tree, scanning the node of the parse tree having the address in question, decoding the element in question and adding 1 to the variable indicative of the current bit position to return to the examination whether an element yet to be decoded exists.

20. The message processing method as set forth in claim 16, wherein said message encoding step comprises the steps of:

when message data is applied, examining whether a node of the parse tree being scanned is a node corresponding to a selected element and when the node is not the corresponding node, adding 1 to an index value being operated and scanning the subsequent node of the parse tree to again return to the examination whether the node being scanned corresponds to the selected element, and when the node is the corresponding node, encoding the index value being operated and encoding the element in question to output the encoding results of the index value and the element in question linked together.

21. The message processing method as set forth in claim 16 wherein said message decoding step comprises the steps of:

when message data is applied, first reading and storing an index field, decoding the contents of the index field to obtain an index value, initializing a variable indicative of a choice number to 0, scanning a subsequent node of the parse tree, examining whether said variable and the index value are equal and if the two values are not equal, adding 1 to said variable to again return to scanning of a subsequent node of the parse tree, and when said variable and the index value are equal, decoding the element in question.

22. The message processing method as set forth in claim 16, wherein in said preamble processing step, the parse tree is stored in a continuos region on a storage region, and said message decoding step comprises the steps of:

when message data is applied, first reading and storing an index field, decoding the contents of the index field to obtain an index value, storing an address of a node being currently scanned in a variable indicative of an address of a node of the parse tree, and scanning a node of the parse tree to be referred to by a sum of said variable and a product of the size of a storage region necessary for holding one node of the parse tree and the index value to decode the element in question.

23. A computer readable memory storing a control program which controls a message processing device for sending and receiving a message composed of one or more elements between different kinds of devices, said control program comprising the steps of:

holding a parse tree generated from syntax descriptions defining structure of a message sent or received;

as message data to be processed is applied, scanning said parse tree to encode and decode a value and outputting encoded and decoded values;

processing a preamble field of a message for use in indicating whether an element exists or not in message data sent or received; and processing an index field of a message for use in indicating what number of element is selected in message data whose one of a plurality of elements is selected to be sent or received.

24. The computer readable memory as set forth in claim 23, wherein said control program in said message encoding step, when message data is applied, examines whether an element yet to be encoded exists in the message data or not, when there is no element yet to be encoded, outputs an encoding result of each element linked after a preamble as an encoding result, when an element yet to be encoded exists, scans a subsequent node of the parse tree to examine whether the element in question is an omissible element or not, when the element in question is not an omissible element, examines whether the node in question is a node corresponding to the element yet to be encoded and when the node in question is not the corresponding node, again returns to the examination whether an element yet to be encoded exists or not, when the node is the corresponding node, encodes the element in question to again return to the examination whether an element yet to be encoded exists or not, when the element in question is an omissible element, generates a 1-bit field, links the field to the trail of the existing preamble and examines whether the node in question is a node corresponding to the element yet to be encoded, and when the node is not the corresponding node, sets the contents of said generated field to the contents indicating that "omissible element is omitted" to again return to the examination whether an element yet to be encoded exists, and when the node in question is a node corresponding to the element yet to be encoded, sets the contents of said generated field to the contents indicating that "omissible element is not omitted" and encodes the element in question to again return to the examination whether an element yet to be encoded exists.

25. The computer readable memory as set forth in claim 23, wherein said control program in said message decoding step, when message data is applied, first reads and stores a preamble field, initializes a variable indicative of a bit position in the preamble field to 0, examines whether there exists an element yet to be decoded in the message data, when no element yet to be decoded exists, outputs a decoding result of each element, when an element yet to be decoded exists, scans the subsequent node of the parse tree to examine whether an element corresponding to the node in question is an omissible element or not and when the element in question is not an omissible element, decodes the element in question to again return to the examination whether an element yet to be decoded exists, when the element in question is an omissible element, if the contents of the current bit position in the preamble field indicate that "omissible element is omitted", adds 1 to a variable indicative of the current bit position to return to the examination whether an element yet to be decoded exists, and if the contents of the current bit position in the preamble field indicate that "omissible element is not omitted", decodes the element in question and adds 1 to the variable indicative of the current bit position to return to the examination whether an element yet to be decoded exists.

26. The computer readable program as set forth in claim 23, wherein said control program in said preamble processing step, stores the parse tree in a continuos region on a storage region, and for decoding a message, when message data is applied, first reads and stores a preamble field, initializes a variable indicative of a bit position in the preamble field to 0, stores an address of a node being currently scanned in a variable indicative of an address of a node of the parse tree, examines whether there exists an element yet to be decoded in the message data, when no element yet to be decoded exists, outputs a decoding result of each element, when an element yet to be decoded exists, examines whether the element in question is an omissible element and when the element in question is not an omissible element, stores an address of a subsequent node in the variable indicative of an address of a node of the parse tree, scans the node of the parse tree having the address in question and decodes the element in question to return to the examination whether an element yet to be decoded exists, when the element in question is an omissible element, if the contents of the current bit position in the preamble field indicate that "omissible element is omitted", stores an address of a subsequent node in the variable indicative of an address of a node of the parse tree and adds 1 to a variable indicative of the current bit position to return to the examination whether an element yet to be decoded exists, and when the contents of the current bit position in the preamble field indicate that "omissible element is not omitted", stores an address of a subsequent node in the variable indicative of an address of a node of the parse tree, scans the node of the parse tree having the address in question, decodes the element in question and adds 1 to the variable indicative of the current bit position to return to the examination whether an element yet to be decoded exists.

27. The computer readable memory as set forth in claim 23, wherein said control program in said message encoding step, when message data is applied, examines whether a node of the parse tree being scanned is a node corresponding to a selected element and when the node is not the corresponding node, adds 1 to an index value being operated and scans the subsequent node of the parse tree to again return to the examination whether the node being scanned corresponds to the selected element, and when the node is the corresponding node, encodes the index value being operated and encodes the element in question to output the encoding results of the index value and the element in question linked together.

28. The computer readable memory as set forth in claim 23, wherein said control program in said message decoding step, when message data is applied, first reads and stores an index field, decodes the contents of the index field to obtain an index value, initializes a variable indicative of a choice number to 0, scans a subsequent node of the parse tree, examines whether said variable and the index value are equal and if the two values are not equal, adds 1 to said variable to again return to scanning of a subsequent node of the parse tree, and when said variable and the index value are equal, decodes the element in question.

29. The computer readable memory as set forth in claim 23, wherein said control program in said preamble processing step, stores the parse tree in a continuos region on a storage region, and for decoding a message, when message data is applied, first reads and stores an index field, decodes the contents of the index field to obtain an index value, stores an address of a node being currently scanned in a variable indicative of an address of a node of the parse tree, and scans a node of the parse tree to be referred to by a sum of said variable and a product of the size of a storage region necessary for holding one node of the parse tree and the index value to decode the element in question.

* * * * *

UNITED STATES PATENT AND TRADEMARK OFFICE
CERTIFICATE OF CORRECTION

PATENT NO.   : 6,154,156
DATED        : November 28, 2000
INVENTOR(S)  : H. Tagato It is certified that error appears in the above-identified patent and that said Letters Patent is hereby corrected as shown below:

Column 11,
Line 65, "message" should read -- message --

Column 12,
Line 3, "I" should read -- 1 --

Column 27,
Line 31, "pares" should read -- parse --

Column 32,
Line 57, "n" should read -- in --

Column 35,
Line 7, "Indicative" should read -- indicative --

Signed and Sealed this

First Day of January, 2002

Attest:

*Attesting Officer*

JAMES E. ROGAN
*Director of the United States Patent and Trademark Office*